US009262535B2

(12) United States Patent
Cohen et al.

(10) Patent No.: US 9,262,535 B2
(45) Date of Patent: Feb. 16, 2016

(54) SYSTEMS AND METHODS FOR SEMANTIC OVERLAY FOR A SEARCHABLE SPACE

(71) Applicant: bublup technologies, inc., McLean, VA (US)

(72) Inventors: Alain J. Cohen, Mclean, VA (US); Marc A. Cohen, Mclean, VA (US)

(73) Assignee: BUBLUP TECHNOLOGIES, INC., McLean, VA (US)

( * ) Notice: Subject to any disclaimer, the term of this patent is extended or adjusted under 35 U.S.C. 154(b) by 0 days.

(21) Appl. No.: 13/921,726

(22) Filed: Jun. 19, 2013

(65) Prior Publication Data

US 2014/0032518 A1   Jan. 30, 2014

Related U.S. Application Data

(60) Provisional application No. 61/661,708, filed on Jun. 19, 2012, provisional application No. 61/836,798, filed on Jun. 19, 2013.

(51) Int. Cl.
G06F 17/30   (2006.01)

(52) U.S. Cl.
CPC .... *G06F 17/30867* (2013.01); *G06F 17/30598* (2013.01); *G06F 17/30731* (2013.01); *G06F 17/30864* (2013.01)

(58) Field of Classification Search
None
See application file for complete search history.

(56) References Cited

U.S. PATENT DOCUMENTS

| 6,314,420 | B1 | 11/2001 | Lang et al. | |
|---|---|---|---|---|
| 7,421,421 | B2 | 9/2008 | Newbold et al. | |
| 8,489,627 | B1* | 7/2013 | Brandt | 707/765 |
| 8,639,734 | B1* | 1/2014 | Cook | G06F 17/30115 707/829 |
| 2005/0268080 | A1* | 12/2005 | Quang | G06F 17/3007 713/1 |
| 2006/0004692 | A1* | 1/2006 | Kaasten | G06F 17/30115 |
| 2006/0026113 | A1* | 2/2006 | Omoigui | 706/55 |
| 2007/0043742 | A1* | 2/2007 | Arguello et al. | 707/100 |
| 2007/0050361 | A1* | 3/2007 | Al-Masri | 707/7 |
| 2008/0104045 | A1 | 5/2008 | Cohen et al. | |
| 2008/0114755 | A1 | 5/2008 | Wolters et al. | |
| 2008/0270391 | A1 | 10/2008 | Newbold et al. | |
| 2009/0012842 | A1 | 1/2009 | Srinivasan et al. | |
| 2009/0019026 | A1 | 1/2009 | Valdes-Perez et al. | |
| 2009/0171866 | A1* | 7/2009 | Harun | G06N 99/005 706/12 |

(Continued)

OTHER PUBLICATIONS

Gopal et al., "Integrating content-based access mechanisms with hierarchical file systems," Proceedings of the 3rd Symposium on Operating Systems Design and Implementation, New Orleans, Louisiana, Feb. 1999.*

(Continued)

*Primary Examiner* — Jay Morrison
(74) *Attorney, Agent, or Firm* — Clyde E. Findley

(57) ABSTRACT

The embodiments of the present invention provide a novel way of searching and interacting with content available via a network, such as the Internet, and the World Wide Web. In some embodiments, systems and methods provide a semantically-oriented structure for organizing and accessing content items. The semantic organization can be derived by leveraging user interactions with the content items. The systems and methods leverage the semantics of the content items and to help the user find content items that are consistent with the purpose of the user's search. In addition, the embodiments provide a novel navigation paradigm of search results and content items so that the user can more intuitively and more efficiently get information form an information space.

30 Claims, 7 Drawing Sheets

(56) References Cited

U.S. PATENT DOCUMENTS

| | | | |
|---|---|---|---|
| 2009/0234849 A1 | 9/2009 | Erera et al. | |
| 2009/0276729 A1* | 11/2009 | Cantu-Paz | 715/811 |
| 2010/0082709 A1* | 4/2010 | Yamamoto | 707/812 |
| 2011/0093471 A1* | 4/2011 | Brockway et al. | 707/747 |
| 2011/0106834 A1 | 5/2011 | Blackwell et al. | |
| 2012/0330937 A1* | 12/2012 | Frazier | 707/723 |
| 2013/0159451 A1* | 6/2013 | Luciw | 709/213 |
| 2013/0290347 A1* | 10/2013 | Saib | G06F 17/30867 707/748 |

OTHER PUBLICATIONS

Zamir, et al., "Grouper: A Dynamic Clustering Interface to Web Search Results", 15 pages.
Bonnel, et al., "Effective Organization and Visualization of Web Search Results", Proceedings of the 24th IASTED International Multi-Conference, Internet and Multimedia Systems and Applications, Feb. 13-15, 2006, pp. 209-216.
Tvarozek, et al., "Collaborative Multi-Paradigm Exploratory Search", WebScience 2008, 5 pages.
Lee, et al., "Semantic Association-Based Search and Visualization Method on the Semantic Web Portal", IJCNC, vol. 2, No. 1, Jan. 2010, pp. 140-152.
Padgett, et al., "A Semantic Visualization Tool for Knowledge Discovery and Exploration in a Collaborative Environment", 2 pages.
Fu, et al., "Collaborative Querying using the Query Graph Visualizer", 2005, Online Information Review, 29(3), pp. 266-282.
Hearst, et al., "What Should Blog Search Look Like'?", SSM, Oct. 30, 2008, 4 pages.
Hearst, et al., "Finding the FL Site Sear", Communications of the ACM, Sep. 2002, vol. 45, No. 9, pp. 42-49.
Hearst, "Clustering Versus Faceted Categories for Information Exploration", Communications of the ACM, Apr. 2006, vol. 49, No. 4, pp. 59-61.
Stoica, et al., "Automating Creation of Hierarchical Faceted Metadata Structures", 8 pages.
English et al., "Hierarchical Faceted Metadata in Site Search Interfaces", 2 pages.
Collective Intellect, "Semantic Filtering Technology", pp. 1-7.
Hearst, "Next Generation Web Search: Setting Our Sites", IEEE, 2000, pp. 1-11.
Eckert, "Thesaurus Analysis and Visualization in Semantic Search Applications", Diploma Thesis, May 2007, 83 pages.
Elliott, "Flamenco Image Browser: Using Metadata to Improve Image Search During Architectural Design", 2 pages.
English, et al., "Examining the Usability of Web Site Search", 10 pages.
Hearst, "Design Recommendations for Hierarchical Faceted Search Interfaces", 5 pages.
English, et al., "Flexible Search and Navigation using Faceted Metadata", 9 pages.
Yee, et al., "Feceted Metadata for Image Search and Browsing", CHI 2003, 8 pages.
Hearst, "Uls for Faceted Navigation Recent Advances and Remaining Open Problems", 5 pages.
Hearst, "Faceted Metadata for Site Navigation and Search" Power Point, 2009.
Stoica, et al., "Nearly-Automated Metadata Hierarchical Creation", In the Proceedings of HLT-NAACL, 2004, 4 pages.
Mark, et al., "A Model of Synchronous Collaborative Information Visualization", Proceedings of IV03 7th International Conf. on Information Visualization, Jul. 2003.
Stoyanovich, et al., "Semantic Ranking and Result Visualization for Life Sciences Publications", 12 pages.
Tvarozek, et al., "Personalized View-Based Search and Visualization as a Means for Deep/Semantic Web Data Access", WWW 2008 / Poster Paper, pp. 1023-1024.
Stoica, et al., "Demonstration: Using WorldNet to Build Hierarchial Facet Categories", 4 pages.
Chase, et al., "Semantic Visualization", pp. 52-62.
Dork, et al., "Towards Visual Web Search: Interactive Query Formulation and Search Result Visualization", WWW 2009, 4 pages.
Page, "A Taxonomic Search Engine: Federating taxonomic databases using web services", BMC Bioinformatics, Mar. 9, 2005, pp. 1-8.
Taxonomy and Search Applications, White Paper, Project Performance Corporation, 19 pages.

* cited by examiner

SYSTEMS AND METHODS FOR SEMANTIC OVERLAY FOR A SEARCHABLE SPACE

CROSS-REFERENCE TO RELATED APPLICATIONS

The present application claims priority to U.S. Provisional Application No. 61/661,708, entitled "SEMANTIC SEARCH OVERLAY SYSTEM," filed Jun. 19, 2012, and U.S. Provisional Application No. 61/836,798, entitled "SEMANTIC SEARCH OVERLAY SYSTEM," filed Jun. 19, 2013, both of which are incorporated by reference in their entirety.

FIELD

The present invention relates to information systems, and more particularly, embodiments of the present invention relate to systems and methods for improving the accuracy of searches for information in an information space.

BACKGROUND

Information spaces, such as the Internet, enterprise networks, etc., allow widespread access to large collections of information. For example, users commonly use search engines to locate and select their desired information on the Internet. Many entities, such as businesses, individuals, government organizations, etc., now use the Internet to publish information, advertise goods and services that they provide. Publishers have an interest in ensuring that their content can be easily located. Also, users performing searches have an interest in locating items that are most relevant to their search.

Depending on the information space and how it is organized, a user's search may seek items containing varying types of information. Special tags may be placed on items to permit the user to make use of those tags in specifying a query to a search engine. The tags may refer to various properties of items, such as the date of publication, the size of the items, the number of times the items have been accessed, etc.

in conventional search engines, the user that is searching must guess the correct combination of keywords for a desired concept. Content provider also must guess as to how the document will be searched. People are searching for words, not ideas, in the prior art. This "guessing problem" represents an issue for both content users and content providers. A variety of words can map to ideas in multiple and non-unique ways making tagging and searching based on keywords difficult. However, a combination of words is unlikely to be the same between two users. Search engines operate on literal matching in actual content or tags. Accordingly, concept or semantic matching of search engines is still poor. Unfortunately, even with the use of such tags, conventional search engines simply match keywords and are ineffective at leveraging the true meaning or semantics of the search. Conventional search engines are very ineffective at leveraging the meaning that is inherent in content items. Indeed, because, for many items, item content is expressed in natural language with no convention or structure governing the meaning of the items, search engines are, in general, unable to locate items based on their meaning or significance.

The conventional search interface consisting of a query box and a list of search results provides a relatively poor user experience for navigation of information spaces. Furthermore, attempts at providing enhanced search, such as faceted metadata, tags, etc., have faded to significantly improve the search experience. The use and maintenance of metadata and tags is difficult to produce and can be of varying quality.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

DESCRIPTION OF THE EMBODIMENTS

Figure 1:
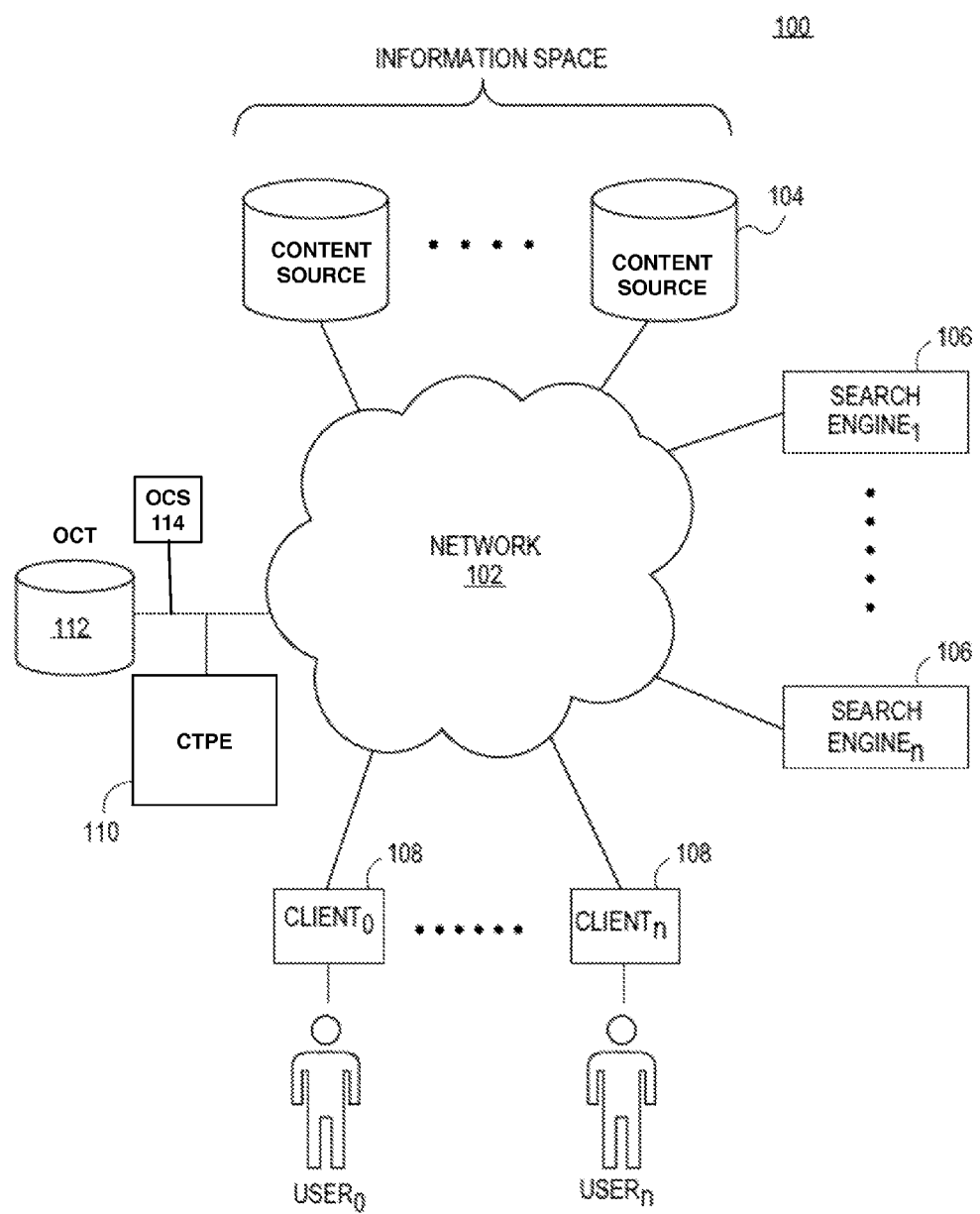
FIG. 1 illustrates an exemplary system of the present disclosure.

As noted, search engines assist users in locating search items, such as documents, images, videos, files, etc., typically based on literal keyword matching or approximate matching to the words or symbols specified in a user's query or search request. However, because of the extremely large variety and arbitrary representation of search items, it is not possible for conventional search engines to obtain or determine semantic information about search items. Thus, with conventional technology, users must search on a literal basis rather than a semantic basis. Unfortunately, while this approach can locate some items that may be of interest to a user, this form of searching produces numerous useless results and fails to provide the user an intuitive mechanism for browsing or navigating through the results.

Overview

In general, the present invention provides a novel way of searching and interacting with content available via a network, such as the Internet, and the Worldwide Web. In some embodiments, systems and methods provide a semantically-oriented structure for organizing and accessing content items. The semantic organization can be derived by leveraging user interactions with the content items. The embodiments of the present invention provide an approach for more efficient searching, knowledge discovery, content discovery, and browsing or navigating in an information space, such as the World Wide Web or WWW on the Internet. The system leverages the semantics of the content items and the purpose of the user's search. In addition, the embodiments provide a novel navigation paradigm of search results and content items so that the user can more intuitively and more efficiently get information form an information space, such as the Internet. The information space may comprise various content sources.

In some embodiments, a person can navigate or descend through various levels or nodes of an organized structure. This structure can be any type of data structure or graph that is cyclic, acyclic, as well as hierarchical or non-hierarchical. In some embodiments, the system employs a tree-like structure, such as an organized content tree ("OCT"). In one embodiment, the OCT is leveraged to support a display of folders. The folders may be structured to provide a progressively narrower scope of subject matter, which helps the users search and/or browser for content of a specific type.

A content source is any body of information having individual items of content. An example of such a content source is the World Wide Web or "WWW" where items are the resources accessible via uniform resource locators (URLs) via the Internet. The items of content may be web pages, images, files, or other items that can be provided to a user, such as via a browser or other type of user interface application.

Optionally, the embodiments may allow the same content reference (i.e., a reference to the same item in the content source) to be present in the organized structure in multiple folders. Some embodiments may place a limit on the number of folders that can reference the same item, while other embodiments may allow this number to be unbounded.

In some embodiments, the system leverages the semantics of the items based on interpreting user interactions and organizes the content in an organized structure, such as an OCT. The system may also leverage the semantics of the items, for example, based on user's declarations about the content items.

Some embodiments are based on systems and methods for determining the semantics of content as indicated by user-derived information and attempts to improve the search results based on user-derived information. User-derived information may be any information that originates from an individual user, such as the user requesting the search, a group of users, or an entire community of users. That is, the embodiments provide mechanisms and algorithms for improving and capturing semantics of items as organized by users in a user community based on, among other things, user interactions, such as a click-through, printing, saving, email, etc. Accordingly, in some embodiments, the system leverages user interactions to determine semantics about the content items and provides an organized structure, such as an OCT, so that users can search and/or navigate through content items.

In some embodiments, a search operation with a conventional search engine is not required in many of the modes. For example, a user can simply navigate through the OCT. The organization and structure of the OCT itself provides semantic information and value. Of note, the embodiments capture and leverage semantic information from the user community and their interaction with the content items and OCT. The OCT uses this information to assist the user. By leveraging user information, the OCT is constantly changing and responding to user interactions and feedback. For example, the embodiments can provide systems and methods that enhance a user's ability to organize the raw search results from one or more search engines. The user-derived information may be anonymous or identified with one or more users. Classification of the document by the system from user-derived information is a key aspect of the invention. An author or creator of the content items may attempt to self-declare a content item, such as a document, for a particular classification. This may be used in combination with the user interactions with the content item.

The embodiments provide an alternative to conventional search engines that predominantly employ index-based or query-based searching for users seeking specific types of content in large information repositories, such as the World Wide Web. The embodiments can apply to repositories that are small or moderate in size, as well as the largest distributed repositories, such as the World Wide Web. Unlike conventional search engines, in the embodiments, the user is provided a more controlled and semantically-driven approach to locating content. The known search engines do not provide a semantically oriented approach to accessing the content. The embodiments provide for various modalities of searching using queries, and navigating an organized structure, such as a hierarchy of interactive menus or folders in a user interface, alone or in combination.

An SSOS Embodiment

For purposes of convenience, the present disclosure may refer to some embodiments of this concept as a "Semantic Search Overlay System", or "SSOS". The SSOS generates and maintains a semantic overlay that users may use to efficiently retrieve and navigate results obtained from information spaces and content sources. The overlay may be any separate, but related body of information that is displayed and/or mapped to the content source and content items. The overlay facilitates access to the contents in one or more ways that is semantically intuitive to the user. In some embodiments, the semantic overlay may be implemented in a tree structure or hierarchy. For example, in one embodiment, the SSOS comprises an organized structure or organized content base (OCB) of which an organized content tree (or "OCT") is an example that is depicted to the user in the form of a hierarchically organized set of groupings, stacks, directories, or folders, and the like. As noted, the SSOS and related methods may employ any type of structure or graph to organize the content items in a semantic fashion. For example, the organized structure may be a graph that is cyclic or acyclic. In addition, the organized structure may be a hierarchical tree and comprise progressive levels of narrower semantic scope. For purposes of illustration, an OCT is provided as an example of an organized structure that is created by leveraging user interactions with the content items. Those skilled in the art will recognize that the OCT is just one form of organized structure that may be used in the embodiments. Other structures are possible and are within the principles of the present invention.

The SSOS may also comprise a content policy tree engine (or "CTPE") to populate and maintain the OCT, for example, using user-derived information. The figures illustrate an OCT implementation maintained by a CTPE.

In addition, a result organization tool (or "ROT") may be provided in some of the embodiments and assists the user. The ROT may be configured to collect or record the user-derived information. As will be described further below, the ROT may operate alone or in conjunction with conventional search tools. Optionally, the ROT may then share the user-derived information with the CTPE or any other type of semantic information with the CTPE. The CTPE may be implemented using well-known hardware and software, such as one or more servers, or other form of computer system. The CTPE may then employ various algorithms and workflows to maintain the OCT based on this feedback from the ROT. The ROT can be an application, a program, a tool, a widget, etc. that assists the user with organizing content items.

As one feature, the ROT provides enhanced organization of raw results obtained from existing search engines. The organization of the search items may be presented in various ways and comprise filtering, sorting, categorizing, and grouping. The organization of the search items may be based upon an overlay of semantic information that does not require embedded semantic information in the content.

In some embodiments, the ROT may operate in one or more modes. For example, the present disclosure describes four (4) exemplary modes of operation to illustrate the principles of the present invention. In a first mode (or pure consumer mode), the ROT may operate as a stand-alone client running on the user's machine. In this private/stand-alone mode, the ROT does not request or share information about the user or the user's searches. In a second mode, the ROT may selectively request information from the OCT to assist in organizing the user's search. In this private/consumer mode, the ROT may continue to keep private information about the user and the user's searches. In some embodiments, the ROT may populate, access, and maintain a "local" OCT or other type of organized structure. The local repository could be organized in various ways, such as a tree, list, etc., that is specific to an individual user or group of users associated with a particular client or user of the ROT. The local OCT may also be specific to particular purpose of a user (or client device). The storage for the local OCT may be implemented physically on the client device, such as a hard disk drive, or implemented virtually using remote services over a network, such as cloud-based storage. In addition, the local OCT may comprise a similar semantic organization as the OCT, but comprises content items that are retained for the specific purposes of a user.

Alternatively, the ROT may be configured to share or cooperate with other search tools (of other users) and the OCT. For example, in a third mode, the ROT shares information about the user and the user's searches with the CTPE and the OCT. The ROT may also optionally use the collective information in the OCT to improve and organize the results of searches conducted by a user. Furthermore, in a fourth mode (or direct search mode), the ROT may leverage the information collected in the semantic information base provided by the organized structure created by leveraging the user interactions with the content items, such as an OCT.

As noted, the ROT may share its user-derived information with the CTPE and OCT. The OCT thus becomes a collective knowledge base obtained from the community of users or a collective of users. The knowledge of users may be assembled in various ways and segregated to suit the needs and requirements of any one user or a group of users. For example, the OCT may serve as an archive of users' searches and their interactions with these searches. Various aspects of this semantic information may be shared with users generally or in limited fashion within groups of users.

The ROT (using the OCT) may also provide guidance or suggested organizations to searches being conducted by various users. The guidance may be static or depend on the behavior of various users. For example, the guidance may relate to organizing search results by category where category information is derived from where documents are positioned in the OCT. Additionally, organizational suggestions may be a function of date, popularity, subject, file type, etc. As noted above, the OCT as an organizing structure may evolve and react to user feedback and user interactions with the content items.

In the embodiments, the ROT may employ other features to help with accessing the content items. For example, if an OCT comprises a large number of folders or a folder with a large number of content items, the OCT and ROT may provide various ways to subdivide or provide a user interface to efficiently present such a large number of folders or content items, such as by date range, by tags, by alphabetical order, etc.

Reference will now be made the figures to illustrate various aspects and embodiments of the present invention. Referring now to FIG. 1, an exemplary system for an implementation of the semantic search overlay system or "SSOS" 100 is shown. As shown, the SSOS 100 may comprise a network 102, one or more content sources 104, one or more search engines 106, clients 108, a CTPE 110, and OCT 112. These components will now be described in more detail below.

Network 102 provides a communication infrastructure that couples together the components of the SSOS 100. The network 102 may comprise one or more networks, such as a local area network, the Internet, or other type of wide area network. In addition, network 102 may support a wide variety of known protocols, such as the transport control protocol and Internet protocol ("TCP/IP") and -hypertext transport protocol ("HTTP"). In some embodiments, the network 102 may be implemented using the Internet.

Content sources (or information spaces) 104 conceptually represent any collection of information provided by a publisher or other source of information. Content sources 104 may comprise various types of content sources, such as documents, multimedia, images, etc. A content source is any body of content having individual items of content. An example of such a content source is the World Wide Web where items are any resources accessible via uniform resource locators (URLs). The items of content may be web pages, files, or other items that can be provided to a user, such as via a browser or other type of user interface application. Furthermore, the embodiments may incorporate various types of storage, such as direct attached storage, network attached storage, and cloud-based storage to store and access its information.

Search engines 106 represent any system or application that is designed to search for information available on the network 102. For example, search engines 106 may represent such well known conventional search engines as Google, Yahoo, Bing, Alta Vista, etc. that commonly provide only a simplistic user interface for searching and presenting search results, such as with simplistic lists. In general, search engines 106 may present their results in a list format. In contrast, as will be further described below, the embodiments of the present disclosure may enhance a user's search by providing a semantic overlay that organizes search results based on their meaning as will be described further below.

Figure 2:
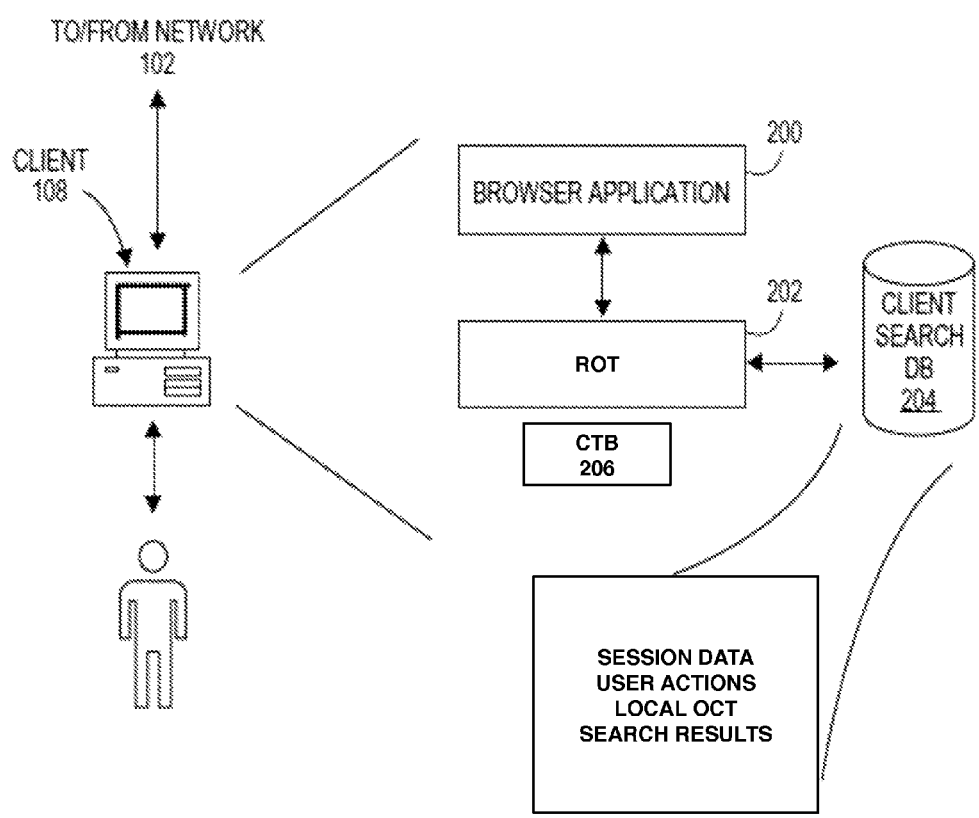
FIG. 2 illustrates an exemplary search assistant client of the present disclosure.

Clients 108 provide an interface for SSOS 100. Client 108 may be implemented using a variety of devices and software. For example client 108 may be implemented on a personal computer, laptop computer, mobile device, such as a smartphone or tablet computer, etc. In addition, client 108 may run under an operating system, such as the LINUX operating system, the Microsoft Windows operating system, The Apple iOS operating system, and the like. Client 108 may also operate through an Internet browser application, such as Firefox by Mozilla, Internet Explorer by Microsoft Corporation, or Netscape Navigator by Netscape Communications Corporation. FIG. 2 provides further information regarding client 108. For example, the client 108 may comprise a user-side application, called the "search assistant," e.g., the ROT. The ROT may be implemented based on one more software programs employed by the user to process the search items returned by the search engines 106.

The client 108 may comprise a memory and local storage (not shown), such as a hard disk drive, an external disk drive, and the like. In addition, the client 108 may utilize various types of storage systems and services, such as network attached storage, storage area networks, and cloud-based storage services via the network 102.

Leveraging User Interactions

In the embodiments, the SSOS 100 attempts to leverage information about user interactions in order to determine or derive semantic information about the content. Below are some examples of the user interactions that can be leveraged by the SSOS 100.

Self-Declaration of Folder Paths

One of the principal challenges addressed by the SSOS system 100 is placing content items, such as documents (where the term "document" is used in a general sense to represent content of any kind, similar to "resources" on the World Wide Web or enterprise network, etc.) in the appropriate folders within the OCT 112. One approach is to leverage the intelligence of human users who organize and assign properties to documents.

An additional approach for selecting folders in the OCT 112, which is complementary to the one mentioned above, is based on information that is associated with the content items in a "declarative" manner. The term "declarative" refers to the fact that someone (e.g., an administrator or an individual responsible for publishing the document) asserts that certain descriptive information is associated with a given document. The declaration can be made through configuration. Such configuration can be made within a content item itself, or in another location that is established by convention. For example, in certain types of content sources, which store content in files on servers (such as the Internet), one possible system would be to place the declaration in a file that is stored in the same file system folder or directory as the content items itself, and that has the same base name as the content item, followed by a pre-established suffix. Another possible approach to publishing declarations in a known location would be to place all declarations for content items within a given folder (directory) inside a single file within that same directory. The file could have any name that is established by convention and reserved for this purpose, such as ".semantic declaration". It is straightforward to create a mechanism to associate declarations with documents in the content source.

Declaring Suggestions for OCT Locations

Regardless of the approach taken for storing declarations, the purpose of a declaration is to provide a suggestion to the SSOS 100 for the placement of the document within the OCT 112. The structure of the declaration adheres to a convention specified by the SSOS 100 operator. In other words, for the SSOS 100 to interpret the declaration correctly, it must contain certain elements, and may have additional optional elements. Many structures are possible, and our purpose here is not to describe all of the possible ones, but rather the type of information that is needed or useful in a declaration.

Of course, the declaration may identify the document of interest. The simplest and most literal form of declaration then simply states one or more pathnames specifying the location in the OCT 112 where the document should be placed. The OCT may allow the same document to be positioned in multiple locations within it.

Additionally, the SSOS 100 may allow for a more abstract or partial suggestion for the positioning of the document within the OCT 112. For example, a partial pathname that omits the initial folders in the path is a possible specification. In such a case, the declarer is requesting that the SSOS 100 use its own methods to determine the complete pathnames in which to position the document. One possible method could, for example, select any full pathname that ends with the partial path specified in the declaration. Another possible method would consider any full pathname ending with the partial path, but in addition, select the best complete path (i.e., the lowest level folder) based on an "affinity" between the document and other documents in that same location. Many algorithms can be used to determine affinity, including commonality of content, or commonality of meta-data among the documents being compared.

Similarly, another possible abstract form of declaration can omit trailing components of the path, and allow the SSOS 100 to select the complete pathnames based on its own automated methods. Again, as an example, affinity calculation methods can be used for this purpose.

Additionally, the information in the declaration can be processed in conjunction with information gleaned from the SSOS 100 user population with respect to the document of interest. In other words, the declaration is treated by the SSOS 100 as a suggestion that carries some weight, but is not the sole determinant of the document's ultimate position in the OCT 112. For example, the publisher of the document may have a desire to position the document in a location that most users do not agree is appropriate. In such a case, the SSOS 100 may choose to accept the opinion of the user population, rather than the opinion of the document's publisher. It is clear that many different policies can be implemented to blend the user information with the declarative information. Furthermore, these policies may offer tuning mechanisms, such as "weights" or coefficients allowing an SSOS 100 administrator to grant more importance to one source of information rather than another.

As discussed above, for each document, a declaration may contain multiple suggestions for OCT 112 folders that would be appropriate locations to contain the document. In certain implementations, the conventions for configuration may be extended to allow additional parameters. For example, an additional parameter may represent a priority value associated with each suggested location. The priority value may be a number (or alternatively a reserved key word, such as "high", "medium", and "low") that indicates the strength of the suggestion. For example, if two suggestions are made as part of a declaration, "A" and "B", and "A" is assigned a priority of 10 and "B" is assigned a priority of "5", the "Declarer" (i.e., the author of the declaration) is stating that it is more important in his opinion to honor suggestion "A" than suggestion "B". This may become important, for example, if in a particular SSOS 100 implementation, there is a limit on the number of locations that a document can occupy.

Encouraging High Quality Suggestions

One concern with supporting a declarative approach is that publishers of documents may abuse the system and suggest that their documents be placed in the most visible locations (e.g., higher level folders) rather than the most appropriate locations. However, the SSOS 100 may implement mechanisms to discourage publishers of documents from committing such actions. For example, one mechanism imposes a penalty on a publisher for "poor" suggestions. Poor suggestions may be determined based on input from the SSOS 100 user community. For example, if the vast majority of users indicate (through their interactions in the ROT) that a suggestion was invalid, then the publisher of the document (who also assumes responsibility for the declaration of the suggestion(s)) may be penalized by the SSOS 100. Such a penalty may be reflected by accumulating "penalty points" for the publisher, for example. Furthermore, the effect of the penalty may be to ultimately discredit the publisher's suggestions and therefore decrease the likelihood that the SSOS 100 will honor that publisher's suggestions. This is just one example of a feedback system that can be used to encourage good behavior by document publishers who are making declarations for their documents. For example, additional penalties or outright "disqualification" of a publisher may be imposed if a suggestion is considered inappropriate as determined by an SSOS 100 administrator. In general, it should be clear that there are various schemes that can be used to accomplish such a purpose.

Identifying Document Publishers and "Declarers"

Note that the immediately preceding discussion relies on the notion of a "publisher" being known to the system. Indeed, if a penalty is to be imposed on a publisher, it is clear that the SSOS 100 system must be able to differentiate among different publishers of different documents, in order to not penalize the "wrong" publisher. There are several mechanisms that can be used to identify a publisher. One approach is to consider the "container" for the document to be the publisher. The concept of a container refers to a group of documents that belong together within a single logical sub-area of the content source 104. For example, in the Internet, a container could simply be a web site, identified by its domain. Every web page within that domain is part of that container, and the domain becomes the "publisher". In essence, the administrators of that domain become responsible for the declarations that are made on behalf of the documents within it. Another possible approach is to associate "publisher" tags with declarations or with suggestions. These publisher tags would be unique across the entire SSOS 100 and may be provided by a specific authority, such as an SSOS administrator, or registration service that grants publisher identifiers.

Content Tree Policy Engine—CTPE

The CTPE 110 is a server-side component that collects user interaction information. The CTPE 110 may be implemented using well-known components of hardware and software. Alternatively, the CTPE 110 may be implemented using cloud-based computing services to perform its various processing functions. In general, the CTPE 110 is configured to collect or receive a wide variety of information regarding user interactions with the content items. This information may be collected or received on an ad-hoc basis or periodic basis directly from the search engines 106 or from the various components of the SSOS 100, the client devices 108, the CTB, the ROT 202, etc. The CTPE 110 may receive the user interaction information via any type of communications protocol or mechanism, such as an API. For example, the CTPE 110 may receive information from the ROT running at clients 108. As noted, in some embodiments, the CTPE 110 is configured to support and manage a semantic overlay, which may be implemented in the form of an organized content tree (or "OCT") 112.

In some embodiments, the CTPE 110 executes content management algorithms on the user input in order to reflect it in the OCT 112 automatically or interactively. This can include adding new content not previously in the OCT 112, modifying the locations of content currently in the OCT 112, removing items from the OCT 112, or writing new meta-data into the items managed by the OCT 112. The CTPE 110 can be configured to collect or request semantic information from the clients 108 in various ways. For example, the ROT may communicate user input either directly or indirectly to the CTPE 110 in response to the user's action or actions. Also, the CTPE 110 may be configured to obtain various user-derived information from clients 108. The CTPE 110 may receive this information on a periodic or ad hoc basis. Alternatively, the CTPE 110 may be configured to record user-derived information from the clients 108. The CTPE 110 may thus receive user-derived information both actively and passively.

Organized Content Server—OCS

The OCS 114 serves as an interface or front-end for the OCT 112. The OCS 114 may comprise various server components that are well known. The OCS 114 may also be implemented using cloud-based processing services via the network 102. The OCS 114 may support various services to the clients 108, such as servicing queries, providing organizational guidance, etc. based on information from the OCT 112. OCS 114 may be implemented based on well-known hardware and software that provides the information processed by the OCT 112.

In some embodiments, as users take action in their respective ROTs, the ROT forwards data about those actions to the OCS 114, which is then forwarded to the CTPE 110. Alternatively, the ROT 202 may be configured to communicate directly with the OCS 114. The data forwarded may pertain to any aspect of the decisions users are making relative to the items or their search sessions. For the purpose of illustration and to simplify the discussion, consider the case in which a user operates on a single content item in the ROT.

Depending on the actions taken, the data forwarded may contain the information discussed below. The data forwarded may be explicit feedback, such as user's indicating the relevance directly or implicit feedback, such as information derived from meta-data or the user's interaction. An explicit action is where the user expresses a different semantic definition than the one provided by the OCT 112. For example, the user may specify a category name for a content item obtained as a search result. An implicit action is where the user organizes some content and the CTPE 110 derives semantic information from this user action. Some examples that may be leveraged in the embodiments are provided below.

The affected content item (e.g., in the context of the WWW, the item may be described by a URL, and perhaps also a timestamp and checksum in case the content referenced by that URL changes in the future).

A category in which the user places the item. If the category is a category name invented by the user, the user's action is considered an implicit action. This means that the user's action is not a fully specified suggestion or directive to the SSOS to position the item in a particular location in the OCT 112. Alternatively, the user may specify a location within the OCT 112, such as a full hierarchical pathname for the item (e.g., selected by the user by navigating the OCT 112). The user may also specify a partial pathname, suggesting to the SSOS 100 that the item be located in a certain part of the OCT 112, and allowing other algorithms to determine the remaining parts of the pathname. As an alternative feature, a user could be asked to specify pathnames if multiple options exist in the OCT 112. For example, for ambiguous categories or folders, the system could provide suggestions of folders.

Meta-data about the item that originates from the user's behavior. This may include: the search terms the user employed to find the item initially using a conventional search engine, the time at which the user discovered the item; the user-declared purpose of the search session; a priority or quality value the user may have assigned to the item.

Filtering, discarding, or blacklisting actions may also be of use to the CTPE 110 algorithms because they are an indication that the item is non-responsive to the purpose of a related search session.

Many algorithms can be implemented in the CTPE 110 to process the many actions and combinations of actions taken by the user population. It is not the purpose of this document to describe the full scope of such algorithms, but rather to describe the overall system concept, architecture, and operation. Therefore, the ideas described below represent only an example of the CTPE 110 processing of certain input from the ROTs 202.

The most basic form of input is an explicit user suggestion that a content item be positioned in a particular folder in the OCT 112. Upon receiving such input, a possible CTPE 110 algorithm may operate as follows.

Check if the content item of interest is already present in the OCT 112. In some embodiments, a document may be located in multiple folders.

If the item is not present anywhere, incorporate it into the OCT 112. Furthermore, the item's presence may be registered in the location specified by the user. The item may also be tagged with information about the user who made the suggestion, the timestamp, and any other meta-data associated with the suggestion. Statistics for the item may be initiated, including a counter for the number of times the suggestion was made to position the item in the specified location.

If the item is already present in the OCT 112, the CTPE 110 evaluates the suggestion relative to information it already possesses concerning the same item. If the suggestion indicates that the item should be located in a folder in which the item is already located, the CTPE 110 may simply update appropriate statistics and meta-data (e.g., increase counters for this suggestion, timestamps, user information, related search session information, etc.).

If the item is present, but the suggestion is to place it in a folder in which it is not currently located, the CTPE 110 decides whether to place it in the suggested folder as well. In some embodiments, the CTPE 110 will allow an item to be present in multiple folders in the OCT 112 since many items are likely to be interesting to users for different reasons, and to accommodate the different ways in which users may naturally think to look for content. However, the CTPE 110 may implement various policies or limits to avoid an item appearing in an excessive number of folders within the OCT 112. A number of different mechanisms may be employed to manage this behavior. A simple mechanism is to cap the number of folders for a given content item and refuse new ones; however, this approach may suffer from the problem that the best suggestions may not be those that are made first, and later, "better" suggestions may be locked out of the system. Another approach may be to accept all suggestions but allow users who view the OCT 112 to show only folders with a certain minimum number of suggestions, thus filtering their view of the OCT 112 to account for the popularity of suggestions as a measure of their acceptability.

Furthermore, the system may employ a probationary concept in some embodiments. Yet another approach is to initially accept the suggestion and position the item, until further input from the user population is obtained through their interactions with the item. Eventually, when sufficient input is received by the CTPE 110, the categorization of the item can be considered final and visible in the OCT 112 to end users, or to become approved for a certain period of time for inclusion in the OCT 112. In one embodiment, the probation concept may comprise a process, such as, 1) Use a beta test group to which the item is made visible in the suggested location, and meanwhile, measure the feedback from that group of users; 2) Allow users to elect to see experimental information, and only such users would be able to see the item in the suggested location; and 3) Randomly include the item when presenting the content of a given location, i.e., folder in the OCT 112.

As evident in the simple examples provided above, many different policies can be devised to process user input and create a SSOS 100 with different characteristics. Note that in this basic example, it is also possible that a new folder would have to be created in the OCT 112 or a local OCT to accommodate the user's suggestion. Here again, many different policies can be devised to govern the creation of new folders in the OCT 112.

Below is a description of a variation of the basic case above, which also entails the potential creation of new folders. In this variation, the user suggests a folder or category name for an item of interest without providing an explicit pathname in the OCT 112, whether new or existing. The OCT 112 may also enable various functions that determine a correspondence or relation between a category and a folder.

In response, the CTPE 110 may perform the following:

Check if the item is already present in the OCT 112.

If the item is not present in any folder in the OCT 112, then the CTPE 110 decides whether to create a folder and where to position it. If one or more folders are already present with the same name of a category or folder, the CTPE 110 must decide which of those folders to use, if any. Of note: this name refers to a category name. Many policies are possible. For example, if there are multiple folders, the suggestion may be ignored because of ambiguity. Alternatively, an algorithm may attempt to decide the best folder to use based on commonality between the new item and other items present in the matching folders. Commonality may be measured for example by looking for similar terms or meta-data between the new item and the items already present. Commonality may also be evaluated by comparing the meta-data of the new item and the meta-data of existing folders.

If the item is not present in any folder in the OCT 112, and if no folder with the same name is present, then the CTPE 110 decides whether to create a new folder with the suggested name and where to position it. One possible approach is to ignore such suggestions because there is insufficient information specified. In other words, under such a policy, new folders could only be created if their pathname is fully specified by a user. Alternatively, an algorithm could attempt to position the new folder based on its name and/or meta-data associated with the suggestion. For example, search terms used to obtain the new item may match the search terms associated with existing folders and the strength of this match could be used to position the new folder parallel to or within an existing folder.

If the item is already present in a single folder with the suggested name, simply update statistics and meta-data of the item.

If the item is present in the OCT 112, but not in a folder with the suggested name, then the CTPE 110 decides whether to create a new folder and, if so, where to position it. The CTPE 110 may apply any approach alone or in combination.

Once again, many policies and approaches are possible to handle the various cases and sub-cases that may arise from user actions. Thus far, the discussion has focused on categorization or equivalently, placement of items within folders. However, many user actions may have more subtle, but nevertheless important, effects on the SSOS 110.

For example, the ranking or scoring of items within a search session provides meta-data that can be used by the CTPE 110 while making determinations about where to locate an item in the OCT 112. As mentioned above, the search session meta-data and the search terms used in a search engine may be leveraged to find the best folder in the OCT 112 to contain a new item. However, if the item is given a low score by the user, then the strength of the item can be considered low and this can be accounted for by the folder selection algorithm used. In the embodiments, the score may be included or determined from the meta-data or provided as additional meta-data.

Also, a user's "negations" of content classifications may represent important information that the CTPE 110 interprets. For example, if a user moves an item from a category in the OCT 112 into a different category, this action is an indication to the CTPE 110 that the user believes the item would be better classified in a different manner. This information can be used by the CTPE 110 to modify the item's meta-data. Furthermore, if sufficient actions of this type are taken, this may ultimately cause the CTPE 110 to decide to remove the item from the corresponding folders in the OCT 112. In explicit actions, the user is made aware that he or she is communicating with the CTPE 110 via the OCS 114 and the ROT. In contrast, for implicit actions, the user is not necessarily intending to communicate with the CTPE 110.

As another example, just as the ROT allows users to suggest an explicit categorization for an item, it may also allow them to explicitly suggest the removal of an item from a category. The users may take this action upon noticing an item they feel is incorrectly categorized within the ROT, or directly within the CTB. Here again, sufficient actions of this type may result in the item being removed from the category where it resides and potentially being moved into a different folder.

The discussion above addresses potential policies that can be implemented to address various combinations of user inputs and SSOS 100. However, as should be understood by those skilled in the art, this discussion addresses only a small combination of these possible alternatives (or options) and is provided to illustrate the range of approaches that SSOS 100 enables to capture and leverage the collective intelligence of the user base while providing them with feature-level benefits that encourage them to continue providing input.

CTPE Content Management and Administration

In one embodiment, the CTPE 110 executes content management algorithms on this user input in order to reflect it in the OCT 112 without human intervention. In other embodiments, the CTPE 110 can be responsive to administrator or super-user input to manage some or all of the content of the OCT 112.

Furthermore, the CTPE 110 may secure its communications with the clients 108. For example, the CTPE 110 may utilize encryption or other forms of encoded communications across the network 102.

OCT As a Searchable Space

The organized content tree (OCT) 112 serves as a repository of semantic information provided by or collected from the users of the SSOS 100 and the clients 108. Thus, the contents of the OCT 112 can be used as a secondary information space, which partially mirrors and enhances the content sources 104 and itself may be searchable by the users. The OCT 112 may contain information about just the placement of content. The content information itself may be stored in another location, for example, in a cloud storage service available in network 102 or a storage system accessible by the SSOS 100. In other words, the OCT 112 may be a set of "pointers", or references to the content; or the OCT 112 may comprise copies of some of the content itself.

The system or the user can elect to store a history of theft search sessions persistently. This feature may be used to provide a historical timeline of the searches, search results, user's activities, and their interactions with the data. This concept ensures persistence of the content.

Leveraging a Hierarchical Organization Structure

As noted, the SSOS 100 may employ various organization structures to help access or search content items in a semantic fashion. In one embodiment of the SSOS 100, the user can use a search paradigm, but may also make use of a navigation paradigm to locate items of interest. In one embodiment, since the OCT 112 is organized in a hierarchical manner, users may perform file-system like operations to refer to items by using pathnames, including wild-carded portions of the path to refer to groups of items. This can be useful, for example, to perform an operation on a group of items of interest, such as copying, printing, or searching through only those items for the occurrence of certain data. The OCT 112 can even offer regular-expression-type search across different sub-trees. The SSOS 100 can provide programs and tools, such as tools like GREP implemented on UNIX. In other words, users can treat the OCT 112 so that it appears like a file system or so that it provides a programmatic system interface. Users can perform a variety of file system like operations.

Exemplary OCT that Displays Content Items with Folders

The folders depicted of the OCT 112 may be displayed by the ROT and act as a "semantic overlay" on information from the content source 104. In other words, in one embodiment, it is the set of folders of the OCT 112—their organization and their naming and their content—that provides the interpretive, or semantic guidance of the system and also provides a location of the content. The goal of this form of semantic display is that users encounter folder names that make sense at each level in the OCT 112. As users descend to more specific levels of the OCT 112, they ultimately can see the items of interest and select them directly; or use additional tools to search for the items of interest in the limited context in which they now find themselves.

In one embodiment, top level folders of the OCT 112 could be predetermined. For example, the top level folders of the OCT 112 could be specified with well known labels for various categories for: Entertainment; Food; Politics; Sports; Business; Travel; Government; Consumer Products; Home; Economy; Art/Culture; Education; Health; Environment; News; History; Nature; Language; Religion; Social Services; People; Science; Technology; Geography; Media; Transportation; Human Relations; Services; Literature; etc. The listing above is merely exemplary and any such labels or categories may be used in the embodiments.

Further, in some of the other embodiments, any of the folders including the top level folders of the OCT 112 may be dynamic or modifiable by users or administrators.

In some embodiments, new candidate folders may be subject to transitional or probationary status before full entry into the OCT 112. The threshold for changing the status of a folder may vary depending on its position within the hierarchy. The threshold could apply to various metrics, such as number of user-driven confirmations that content is correctly located in that folder.

Introduction of a New Folder

In the embodiments, new folders can be introduced to the OCT 112 in various ways. For example, a first user could create a new top level folder. Then, when a sufficient number of subsequent users take the same action, the system could create the new top level folder. As another example: a first user could create a new top level folder. Then, other users, such as a beta group or random or selection of other users, would confirm or follow along with the new top level folder. The number of users could progressively increase as acceptance of the new top level folder gains hold. After passage of time, the new top level folder could be confirmed, changed, or deleted based on reception by the community of users. These examples may be part of different embodiments.

The higher the level, the higher the threshold and/or level of trust required of the user trying to make that change. Additionally, a new candidate folder may be subject to a "probationary" or transitional period before it is confirmed as a top level. This policy could be applied to various depths beyond the top level. Probationary folders can be viewed as "experimental" folders by users. In some embodiments, viewing of experimental folders could be subject to user preferences or kept private.

Foreign Language Support by an OCT

The OCT 112 may also support different languages or linguistic modes. For example, different languages may have an independent OCT 112 or different folders.

Navigation of the OCT

As noted, in one embodiment, the OCT 112 may be shown and navigated as a hierarchically organized set of folders that provides a structured, semantic approach to accessing all or some of the items in a content source 104. For example, the user may run an application, such as a CTB, on their client device 108 and interface and navigate the OCT 112. The folders may contain nested folders to provide greater specificity for a user searching for content of a particular type, the content itself, or content references—links to items in the content source 104, similar to URLs, optionally coupled with meta data to provide users with additional information to help them decide if they have located an element of interest. Metadata can include, for instance, a user-friendly name for a content item, timestamp, ratings, location information, etc. Any form of meta-data may be used in the embodiments.

OCT 112 may provide different levels of access to various parts of the semantic information repository. For example, some semantic information may be available to any user while other information may have limited access to a specific user or group of users. This approach to managing information may be most relevant, for example, to a corporate network. For example, if the SSOS 100 is applied to a corporate repository of documents as opposed to the World Wide Web, then the OCT 112 may have this security measure.

Exemplary Hardware Architecture

Of note, CTPE 110 and OCT 112 are illustrated as components that are co-located, for example, at the same site or on the same platform. One skilled in the art will recognize that the server OCS 110 and OCT 112 may be implemented based on a distributed architecture, and thus, may be co-located or remote from each other on different platforms. For example, the SSOS 100 may comprise multiple instances of the CTPE 110. Likewise, the OCT 112 may comprise a distributed database or data warehouse having storage and files located in a plurality of locations.

FIG. 2 illustrates an exemplary client 108 of the present disclosure. As shown, in the embodiments, the client 108 may further comprise a browser application 200 and the ROT 202. For purposes of illustration, the client 108 is illustrated in simplified form. However, one skilled in the art will recognize the client 108 may comprise other well-known components of hardware and software, such as a processor, keyboard, operating system, etc.

The browser application 200 may be any application that allows the user to interface with items available on the network 102. For example, the browser application 200 may be implemented based on well-known browser applications, such as Firefox by Mozilla, Internet Explorer by Microsoft Corporation, or Netscape Navigator by Netscape Communications Corporation, Chrome by Google, and Safari by Apple, Inc.

Result Organization Tool—ROT

As a search assistant, the ROT 202 assists the user in performing searches. In general, the ROT 202 enables a user to access and interface with search results, the OCT 112, and content items, in various ways. The ROT 202 can also be a helper tool that assists a user to work with conventional search engines 106, for example, exercise one or more search engines 106 to obtain results for search criteria of interest; conduct searches within the OCT 112; or perform a number of organizational functions upon the search results returned. For example, the ROT 202 may provide suggestions (either upon request by the user, or automatically) about how to organize documents into categories. These suggestions may be based on the folders in which those documents were located within the OCT 112, and also the way in which those documents were positioned relative to each other within the OCT 112.

Once the user has indicated an interest in one or more documents, returned, for example, by a conventional search engine, the ROT 202 can suggest pathnames (i.e., hierarchical pathnames within the OCT 112) that would be appropriate locations for the document(s). In particular, if a document already exists within the OCT 112, then the pathname(s) for the folders that contain it can be provided to the user by the ROT 202. This helps the user to understand if it is the appropriate type of document because of the context provided by the pathname. Furthermore, it allows the user to easily select a pathname (e.g., by clicking on a displayed pathname) that he or she favors and use that for organizational purposes within the ROT 202. If, on the other hand, the user selects a document (returned by a conventional search engine search 106) that is not present anywhere in the OCT 112, the ROT 202 may provide suggested pathnames that would be appropriate for positioning the document. These pathnames may be determined based on the position of other documents that are already present in the OCT 112, and are deemed to have sufficient similarity to the new document being introduced. Similarity evaluation is performed by an algorithm that would typically run on the server side of the SSOS 100, as a result of a request by the ROT 202. For example, the algorithm may compare documents for similar metadata, or commonality of content. Upon finding a document with sufficient similarity, the enclosing folder can be suggested as a potentially appropriate pathname. Multiple such suggestions may be presented to a user simultaneously, so that the user can easily make a choice.

In some embodiments, the ROT 202 also comprises a content tree browser or "CTB" 206. The CTB 206 is a tool for navigating and searching through the OCT 112. The CTB 206 may be implemented as a stand-alone application, a browser plug-in, a web-based application, a feature or set of features within the ROT, etc. The CTB 206 may be configured to work on either global or local organized content structure. In addition to the CTB 206, the OCT 112 can present a programmatic interface (e.g., web-services interface, or other programmatic API) so that outside systems can leverage its organization and content. In some embodiments, the ROT 202 and CTB 206 could be integrated or blended together as part of a common interface in a single application or tool that is running on a client device. The CTB 206 may be any application or tool that allows the user to navigate and manipulate the OCT 112 including actions like adding content items to the OCT 112, browsing through various portions of the OCT 112, indicating a desire to move items out of or into different folders in the OCT 112, when they feel the items don't belong, etc. The storage for the OCT 112 may be implemented using various types of storage including direct attached storage, network attached storage, storage area networks, and cloud-based storage services via the network 102.

Results Organization Tool—Publishing a Search Session

In some embodiments, by using the ROT 202, one or more users can compile information on a particular topic or for a particular purpose. In a user community with many users, such as the Internet, an enterprise network, and the like, it is likely that other users will have a similar search objective at some point in the future. To further leverage, for example, the construct of a search session in some embodiments, the SSOS 100 may support an operation allowing a user to publish one of his/her search sessions for others to examine. In one model of such a system, search sessions can be treated as documents and included in the set of searchable documents. In another implementation approach, the set of all search sessions can be targeted as a new universe of searchable information, wherein the results that are returned are search sessions and all the information contained within them.

Administrative Features of the Embodiments

In some embodiments, the SSOS 100 provides various administrative and user feedback features. For example, some known collaborative knowledge bases today make use of user or administrator input to specifically enforce standards of relevance, quality, and acceptability. In the sense that SSOS 100 is also a collaborative knowledge base leveraging the explicit and implicit actions of a user community, an enhancement of some SSOS 100 implementations may also employ various features to collect distributed feedback from users or administrators.

One possible approach, for example, is where the SSOS 100 creates or provides the role of "Custodians" who have responsibility for maintaining the quality of the information in designated areas of the OCT. Custodians may be selected based on their expertise in the relevant area.

A possible operation for such a feature may be the following:

- A particular folder, F, and all of its content (including sub-folders and "leaf" items) is administered in the SSOS 100 by a designated custodian or user.
- Changes to folder F are automatically sent by the SSOS to the custodian for validation.
- The system can operate in a "post-verification" or "pre-verification" mode. In a pre-verification mode, changes may be validated by the custodian prior to being committed into the OCT 112. In the post-verification mode, changes are committed into the OCT 112, and presumed to be valid until they are eventually reviewed by the custodian.
- The post- or pre-verification modes may also be applied by the system depending on the type of change that is introduced to folder F. For example: the introduction of a new item into folder F may require only post-verification, while the introduction of a new folder into folder F or the deletion of an item may require pre-verification.
- A different enforcement policy may be selected for the addition of a new item that is present nowhere in the OCT 112 than for the addition of an item that already resides in another folder.

The enforcement policy of the SSOS 100 may be a function of whether the end-user action that triggered a change was implicit or explicit. These behaviors are all examples of options that an SSOS system may offer the administrator of the system.

Democratic Process Feature

Another possible feature that may be provided by some embodiments is a "democratic" approach. In the democratic approach, a group of users are able to submit votes to the system on whether an item's placement in the OCT 112 is valid. Rather than having the SSOS 100 forward changes to a designated Custodian, users are simply able to submit votes on the correctness of an item's placement if and when they encounter the item in the OCT 112. This approach can be particularly useful for removing items that are not positioned correctly or for reinforcing the initial decision to introduce an item into a particular folder. However, if the "voting process" leads to the removal of an item, the item will no longer be visible to users inspecting the OCT 112. Thus, they will not be able to vote for its retention.

One possible mode of operation by the SSOS 100 is to allow democratic review for a certain amount of time after an item is introduced, after which time, the "voting process" is closed by the system and a decision is made. The ratio of votes in favor of an item's positioning that is required for it to remain in place can be a system parameter. Alternatively, rather than use a time interval to contain the voting process, the SSOS 100 may make the final decision after a certain number of votes have been registered. In a system that has heavy user-traffic, the number of required votes may be attained quickly, so that the item's position is also confirmed by the SSOS 100 shortly after it is introduced.

While the item's status is in flux, the CTB 206, or any API providing access to the OCT 112 content, may indicate the item's condition appropriately. For example, in the CTB's 206 user interface, the item may appear highlighted in some typical fashion used to make items stand out within a group, such as coloration, background change, flashing, appearing next to a special icon, check box, etc. As a special case of this status-dependent representation, an end-user may elect to have their CTB 206 or viewer of the OCT 112 show only folders and items whose status has become final.

The democratic process implemented by the SSOS 100 may also be leveraged to generate a quality score for an item or folder and its position within the OCT 112. The score may be any function of the number of votes in either direction. For example, a simple score could be the number of positive votes divided by the number of total votes. Regardless of how it is computed, the score becomes part of the item's meta-data and can then be leveraged in the presentation of the OCT 112, either via a user interface or via APIs. For example, the score may be used as a filtering mechanism, whereby the end-user requests to see only items whose quality scores exceed a specified threshold. Alternatively, users may configure their CTB 206 preferences to show only the top N items within a given folder, so that they are presented only with the highest quality items.

For an SSOS 100 that employs a democratic process, there may be a concern that users will abuse the system by voting repeatedly, either manually, or by using an automated process (e.g., a software robot) to do so. In order to thwart such behavior, the SSOS 100 may make voting a privilege that is available only to validated users who are required to identify themselves (e.g., authenticate through a log in process). Because their votes are associated with an identity, the system can ensure that each such identified user votes only once for each decision that needs to be made. Furthermore, various techniques may be employed to confirm that a user is in fact a human (e.g., requiring the user to reproduce a word written in a form that is not machine-readable).

Finally, in some embodiments, an SSOS 100 may provide a feedback feature that is a combination of the custodian-based approach and the democratic approach. For example, the democratic process could be used initially by the SSOS 100, and for those situations where the voting result is not overwhelmingly clear, the SSOS 100 may send a request to the custodian (or other users) to intervene and make the final decision. Alternatively, a democratic process implemented by the SSOS 100 could be employed among a group of custodians.

Mobile Use of the ROT and CTB

The use of the CTB 206 to navigate within the OCT 112 can be suited to modern user interfaces such as those commonly employed by smartphone or tablet applications, where typing is minimized in favor of clicking to make selections among a handful of items. Indeed, one feature of the SSOS 100 is that at each level in the OCT 112, a manageable set of items is presented. A reasonable number of items can fit within the screen of a simple user interface and allow the user to make a selection of either an item of interest, or descend into another folder of interest to search more specifically. For example, an SSOS 100 application or "app" for smartphones and tablets may be provided in some embodiments that would provide such an interface, allowing a user to quickly navigate to topics and items of interest.

Of note, the number of folders employed in the embodiments for the SSOS 100 may be a relatively modest amount. For example, consider an embodiment that, in each folder, contains an average of 30 items or other folders. It is believed that a user can easily scan thirty items in order to make a selection among them. By making 8 selections, the user can drill down to a specific folder or item selected among $30^8$ or over 650 billion items. The number of pages is currently estimated to exist on the worldwide web is merely in the tens of billions. Based on this example, it is easy to see the power that SSOS 100 places within the user's hands to quickly locate specific items of interest in the world's largest information repositories. In contrast, conventional search engine searching approaches return large numbers of items, including many items that are "false positives" requiring significant manual work by the user to locate items that are actually responsive to his or her intent.

Managing Folders with Large Numbers of Elements

As described herein, a system built according to the SSOS 100 architecture likely manages large sets of documents by dividing them into progressively smaller groups, arranged in the semantically organized structure, such as in a hierarchical fashion. Documents may be contained in any level of the hierarchy, and it is common for "leaf folders" in particular (folders that contain only documents, but no other sub-folders) to contain many documents. This arises when there are a large number of documents belonging to the same category. Furthermore, there may be no natural sub-categories, or at least none that have resulted from the mechanisms inherent to the SSOS 100. Unless it is addressed, the presence of a very large number of documents in one folder can pose challenges for the usability of the system. In particular, users browsing through the hierarchy may suddenly be confronted with a folder containing thousands, or even millions of documents. Indeed, the mere rendering of the folder's content in the typical fashion, which lists all encompassed documents, becomes impractical. Therefore, it is advisable for an SSOS system 100 to implement one or more strategies for addressing such a situation. Several possible strategies are provided below.

Automatic Chunking of Folder Content

Some embodiments may employ two types of strategies for handling presentation of very large folders, i.e., folders containing many documents. The strategies are: automatic and interactive. The first automatic strategy involves breaking down a folder's content into chunks that are computed based on selected properties of the documents. If the resulting chunks are small enough, then they can be presented to the user in one of the following ways:

A simulated set of folders, presented in the same manner as regular folders in the CTB 206. This has the advantage of looking identical to the user interface users are used to when navigating in any folder.

A different presentation approach, in which the chunks do not look like folders. This approach features an array of chunks, presented as a list or a grid, with each chunk represented in a way that the user can interpret based on the selected document properties. For example a chunk may be a group of documents that spans a certain period of time.

There are many possible strategies for dividing a set of documents into chunks. Several of them are enumerated below. In each case, the presentation approach may use a fixed number of documents per chunk, or alternatively use fixed partitions and place a variable number of documents in each partition. Below are some examples of partitioning.

Partitioning the documents into chunks that are alphabetically ordered and represent a range of "names" assigned to the documents. Those names can be document titles that are native to the document format (e.g., web page titles), or an SSOS system may define a new item of metadata for the purpose of displaying a name for a document.

Partitioning the documents into chunks that are alphabetically ordered based on the name of the publisher of each document. The concept of "publisher" was described above.

Partitioning the documents into chunks that are based on the frequency of access of the documents. This may be computed in various ways, such as a simple average frequency over the entire history of the document, or it may be a weighted average that attributes more importance to frequency of access over more recent periods.

Partitioning the documents into chunks that are based on the date and time of publication of the documents. For example, the most recent documents can be placed into a first folder.

Partitioning the documents into chunks that are based on a score that represents how recently the documents have been accessed Partitioning the documents into chunks that are based on a score that represents the popularity of the documents, where popularity can be defined in multiple ways, including a feedback system that allows users to rate the usefulness of documents.

Capping of Folder Content

Another automatic approach that may be used in some embodiments is to simply cap the number of documents represented for the folder. Some of the ordering criteria described above for chunking can also be used to determine which documents to include in the "capped folder" presentation. For example, selecting the documents that are most popular, or accessed most frequently can be applied for the purpose of capping.

Searching and Filtering

As an alternative, or in addition to automated presentation approaches, the SSOS 100 may offer an interactive approach to exploring a folder containing a very large number of documents. A common interactive approach would be to allow the user to filter the set of documents by specifying search criteria. The search criteria can be applied against the document titles, content, or meta-data, or any combination thereof. The filtering operation is applied only to the documents within the folder of interest.

Once the filtering has completed, any of the previously mentioned automatic approaches may be applied for presenting the resulting documents, including chunking and capping.

Furthermore, the automatic approach may be used in conjunction with the interactive approach by first using an automatic approach, and allowing the user to invoke a search operation at any time to narrow the set of documents. For example, an initial presentation may show a capped set of documents, and indicate to the user the total actual number of documents that are in the folder. Once a search is executed, the filtered set of documents (or a subset of the search results) may be displayed.

Content Tree Browser—CTB

In some embodiments, the CTB 206 provides user interfaces that are selection based (rather than text based). This form of interface may be advantageous for various devices. For example, the CTB 206 may be optimized for mobile devices such as smartphone or tablet applications, where typing is minimized in favor of clicking to make selections among a handful of items. This capability of the CTB 206 is enabled because at each level in the OCT 112, a manageable set of items can be presented by the CTB 206. A reasonable number of items can fit within the screen of a simple user interface and allow the user to make a selection of either an item of interest, or descend into another folder of interest to search more specifically. However, this selection based approach is equally applicable to any computing device. These embodiments could be modified or enhanced for disability for ADA 508 compliance, for example, an audio or speech interface for a blind user.

Exemplary Modes of Operation of the ROT

As noted, the ROT 202 may support several modes of operation. In stand-alone assistance mode, the ROT 202 provides tools for organizing the user's search results. However, the ROT 202 operates independently of the CTPE 110 and does not use the OCT 112 or OCS 114. No data is shared from the SSOS 100. The ROT 202 is merely a client-side application.

In consumer mode, the ROT 202 provides the same useful organizational tools, but exploits information from the OCT 112 to enable the user to better organize search results. In other words, the ROT 202 may interact with the OCS (CTPE 110) and request certain information from OCT 112 to enhance a user's search. However, none of the user's activities and preferences in the ROT 202 are reported back to the CTPE 110. The user's activities may instead be stored in a client search customization database 204 resident on the client 108. The client search customization database 204 may comprise information such as session data and user actions regarding various search results. This mode may be useful, for example, to customize the user's view of their own data of the OCT 112. A user could have multiple instances of their search customization database. For example, the user could have an instance for "work" versus a different instance for "personal."

In knowledge-sharing mode, there is two-way communication between the ROT 202, OCS and the CTPE 110. The ROT 202 uses information from the OCT 112 and also feeds back information to the OCT 112 in order to enhance the OCT 112. The information that is sent back to the OCT 112 relates to how the user chooses to process, such as organize, filter, etc. the search results.

FIGS. 3-6 illustrate exemplary processes of the SSOS 100. In general, the SSOS 100 system provides several approaches to introduce search results into the ROT 202.

A first approach that can be used by a user involves leveraging one or more search engines 106 to obtain an initial or raw set of search results. The user interacts with the search engines 106 as he or she ordinarily would to conduct search queries. When the results of the search queries are returned, the ROT 202 is invoked (either explicitly by the user, or automatically upon detecting the completion of the query) to process the results.

For example, the browser 200 may transfer the search result information to the ROT 202. In some embodiments, the ROT 202 may be triggered by a browser plug-in or may be a plug-in to the browser 200, which is executable within the browser 200, and which has access to the content displayed in the browser 200. Within the ROT 202, the user can then perform further processing and organization of the search results.

In another approach, the ROT 202 does not need to rely on the user interacting with a search engine 106. Rather, the user searches for desired information within the items and content accumulated and processed stored within the OCT 112. The OCT 112 may serve as a useful source of information, because through sufficient and ongoing feedback from its users, the OCT 112 can become populated with a subset of the information obtained from the various search engines in use by a community of users. Furthermore, the OCT 112 provides for further processing, filtering through empirical selection by users, and enrichment of the information. Thus, the contents of the OCT 112 can be used as a new information space for the user's search query via ROT 202 (or browser 200).

Searching the OCT

Once the OCT 112 is widely populated with information, the OCT 112 itself becomes a repository of information that can support powerful search operations. Users may be provided an interface to search for folders or items that respond to any combination of item names, meta-data, and content. Searches may be conducted against the entire OCT 112, or against any sub-tree within the OCT 112. Because the meta-data of the SSOS 100 includes semantically validated information, this search can represent a powerful alternative to searching via a conventional search engine.

Building an Index for the OCT

For example, the meta-data can include the search terms used by many users to originally discover the item. The fact that the item ultimately became categorized and committed in the OCT 112 provides additional assurance that the item is responsive to those search terms. Thus, the search terms have a greater significance than simply matching a string contained within the document.

In one embodiment, indexing would be confined to the items in the OCT 112 including their metadata and the documents they reference in the content source. In general, the embodiments are capable of indexing any part of the document to support searching the OCT.

The OCT 112 may contain the links, the documents, or a hybrid. For example, the OCT may sense that links are very dynamic and therefore, may elect to archive the content or document itself rather than relying on link.

Semantic Search Constructs Enabled by the OCT

The collection of locations in which an item is positioned within the OCT 112 can also be considered searchable meta-data of the item. In some embodiments, a unique record can be maintained for every unique item, and that record can contain a list of positions in the OCT 112 where the item is referenced. Using this meta-data, the semantic power of the SSOS 100 provides new types of search constructs not available in conventional search engines. For example, users can shape their search through additional constructs, such as: Related to <topic>; Not related to <topic list>; Related to <topic> AND not related to <topic>; Related only to <topic>; and Related to multiple <topic list>.

The notion that item J is related to topic T corresponds to J being contained within a folder T (either directly or recursively contained). Since a folder with name T may itself exist in multiple parts of the OCT 112, it may be the user's option to provide either partial or fully qualified pathnames (i.e., from the root of the OCT 112) ending with T.

For example, a user may conduct searches with commands similar or equivalent to the following: Find items related to "golden ratio", but not related to "art"; or Find items related to "mathematics/*/golden ratio", but not related to "art"; or Find items related to "/science/mathematics/numbers/golden ratio" but not related to "art". In response, this search finds documents (e.g., web pages) that discuss the golden ratio from the point of view of its mathematical properties and definition, but not those documents that concentrate on discussing the application of the golden ratio for artistic purposes. Since the latter is also a topic area that is widely documented on the Web, the user's inability to exclude such pages using a conventional search engine will cause their search to potentially generate significant "noise", i.e., documents that are not of interest.

Of note, the use of the wildcard character, such as may be supported in the embodiments. This is one possible way of allowing the user to express that any folder may appear in between "mathematics" and "golden ratio" in the example provided above. However, support for wildcards and the form that is used to express them is an implementation-specific detail of SSOS 100 and the search interface that it provides for searching the OCT 112. Of course, a different character may be used to represent wildcarding, and full support for mechanisms like "regular expressions" may be provided. "Regular expressions" are a well known term that refers to a sequence of text characters, some of which are understood to be meta-characters with symbolic meaning, and some of which have their literal meaning, that together can automatically identify textual material of a given pattern, or process a number of instances of it that can vary from a precise equality to a very general similarity of the pattern.

Also, a wildcard may represent one or more folders. Finally, wildcarding could be implicit in the sense that the system interprets every nested folder as potentially being immediately within the preceding folder in the pathname, or any number of levels beneath it. Thus, "science/numbers" would resolve to "science/mathematics/numbers" as well as perhaps other pathnames that include "science" and "numbers" with zero or more intervening folders in between. The examples mentioned above are just a subset of the many different constructs can be provided to allow users to express the scope of their search within the OCT 112.

Using a conventional search engine, or non-semantic search engine, the user may be able to exclude documents containing the word "Art". However, this may in turn be overly limiting because it is possible that a document that would be of interest may briefly mention that the golden ration has been applied in the artistic field or for some other reason include the word "art", but still not be considered a document whose primary topic is art. Worse yet, for example, in terms of a "false negative", the document may be authored by someone whose first name is "Art", but have nothing to do with the topic of Art. Accordingly, the example above illustrates the semantic power of the SSOS 100.

In some embodiments, the ability to use semantic constructs of the forms described above does not preclude using simple constructs of the form "contains" or "does not contain." These two types of constructs may be used in combination, as well. For example, a user may conduct a search as follows: Find items containing "laptops" related to "computers/reviews"

Commutative Property

In some embodiments, the SSOS 100 may choose to interpret the "related to" construct as commutative or not. For example, in a commutative interpretation, the SSOS 100 would automatically ensure that two following search expressions would return the same result: Find items related to "Boeing" and related to "Airplanes" and Find items related to "Airplanes" and related to "Boeing".

In other words, the user is not necessarily aware of the structure of the OCT 112 in terms of whether Boeing is contained within airplanes, or vice versa. In fact, both of these may exist within the OCT 112. To ensure the same result is returned, the SSOS 100 may look for items within the "Boeing" folder that is itself within the "Airplanes" folder (the latter may be the /technology/vehicles/airplanes" folder, for example). It then looks for items that are within the "Airplanes" folder that is itself within the "Boeing" folder (the latter may be the /business/companies/aerospace/Boeing folder, for example). It may then take the union of the items obtained from these two steps and provide them as a result of the overall search.

In a non-commutative interpretation, each search may yield different results. This may be acceptable, but places the responsibility on the user to understand the nuances that may arise from ordering the search expression in each way.

Presentation of Results

In conventional search engines, algorithms are typically implemented to cause items that are deemed more useful or valuable in some way to be presented with greater precedence. The algorithms generally focus on the popularity of the items, where popularity may relate to: a) the items being selected more frequently by the user population; or b) the items that are referenced most by other items; c) the items that are referenced by other items, with greater importance attributed to references by popular items; d) combinations of (a), (b), and (c). Many algorithms leveraging this type of information are possible and have been implemented by search engines. These algorithms are often used to order the found set of items in a list.

This same concept can be modified and applied to the searches performed in SSOS 100. For example, when the user is browsing within the OCT 112, the presentation of the items is hierarchical rather than a linear list. Therefore, alternative presentation choices become useful. Some of these presentation approaches include: Ordering the folders/items within a folder based on popularity (for example, according to applicable definitions of popularity mentioned above in the context of conventional search engines); Using visual indicators to indicate popularity (e.g. coloring folders, placing a score next to them, or an icon of some kind to indicate popularity, including changing the size of the folder); and indicating the attractiveness of each item at the current hierarchical level specifically with respect to the user's current search effort (either by ordering them or using visual indicators.)

ROT and CTB Working Together

When the user is browsing items of the OCT 112 within the CTB 206, this may cause the CTB 206 to use information from the ROT 202 in order to be aware of the user's search goals. This information can comprise: a) search terms employed by the user so far during the search session; b) items already selected by the user as being of interest; c) categories in which the user has positioned selected items; d) a statement of the search session purpose or a name given to the search session. Based on this information, the SSOS 100 can suggest which folders are more likely to lead to items of interest. For example, the CTB 206 may have to obtain a suggestion from the OCS 114.

As discussed earlier, the ROT 202 also provides an interface for searching using search engines, or equivalently, a mechanism for acquiring results from searches conducted using search engines In some embodiments, the ROT 202 may detect a search "session" for the users at clients 108. For example, the ROT 202 may automatically begin a search session when the user accesses a conventional search engine. As another example, the ROT 202 may prompt the user to start a new session or retrieve information about an existing or past session.

Search Session

A search session thus refers to any sequence of searches having an overarching purpose or meaning for the user. The ROT 202 provides search sessions as an organizational capability that is not provided by search engines 106. The notion of a search session enables a user to group together an arbitrary set of individual search queries submitted to one or more search engines 106. More precisely, because the ROT 202 understands that the results of a set of search queries are related, these can be analyzed and processed together, and combined to produce the ultimate set of results desired by the user. As noted, this information may be shared as semantic information back to CTPE 110 for contribution to the OCT 112.

By introducing the concept of a search session, the ROT 202 addresses the needs of users to modify their search using varied approaches in order to hone in on relevant information. Furthermore, the search session offers long-term persistence of results, (e.g., that can be stored in the search database 204 or in OCT 112) so that additional search queries may contribute to the search session over time. These queries need not be conducted consecutively or by the same user. The ROT 202 can support and store all required information to maintain multiple search sessions simultaneously. Search sessions may continue to be accessible to a user until the user decides to delete them from the database 204. User activities within a search session may be tracked and reported back to the OCS. Example, the many searches executed for planning a vacation may be within a session, which allows the system to unify and organize the results in the OCT 112 accordingly. The search sessions are not required, but are one way to obtain meta-data about user searches and classify related user activities. Within a search session, the user is likely more motivated to classify and feedback information and "invest" in the search session.

In some modes, the ROT 202 records decisions taken by the user and transmits that information or selected aspects of that information back to the server 110. For example, the decision of the user to place certain search results in particular categories may be sent back to the server 110. Similarly, the decision to filter or prioritize certain items may be of interest and sent back to server 110. This type of information is then processed by the server 110 in order to enhance the OCT 112. This enables it to enrich the information associated with search results and also with search queries. Thus, the intelligent processing at a semantic level by users and the ROT 202 can be leveraged to associate semantic information with content from the information space 104. In other words, taken from the perspective of a given search item in the information space 104, when one or more users encounter and make decisions relative to that search item, the item can be enhanced with semantic information based on those decisions.

In other modes, the user at client 108 may benefit from the semantic information contained in the OCT 112 in order to improve his or her search experience. For instance, the semantic information can be used to automate organization of search results, including automatic or assisted categorization, filtering, and prioritization. The ROT 202 can also display various types of semantic information to enrich the search result presentation.

Leveraging the concept of the search session, the ROT 202 can communicate affinities among search results that otherwise would not be known to the index based (use "conventional" rather than index based) search engines 106. To elaborate, the multiple results of multiple search queries submitted within a single search session can be presumed to be semantically-related if the user selects the result (and especially if the user classifies the results in the OCT 112) since the user typically conducts a search session for a single purpose. Relationships therefore can be inferred among search queries and also among search results. The combinations of search results that are generated by the users organizational decisions within the ROT 202 can be communicated back to the server OCS 114 and CTPE 110 in order to again enrich the OCT 112. Enrichment may be in form of additional metadata and suggestions, such as showing the user items other results selected by other users for a search session that is deemed similar or related (based on matching meta-data or content). One practical use of this mechanism allows a user conducting a search session to invoke an automated search enhancement feature. Example: an item centric approach that shows other items that are semantically related. Such a feature can automatically return to the user related search results that were generated by the intelligent actions of prior users conducting searches with similar semantic objectives.

By observing the actions and decisions of users, the OCS 114 can infer relationships among search items. For example, the ROT 202 may be able to observe interactions such as classifying, discarding, sharing, emailing, etc., by the user with the ROT 202 or other applications running on the client 108. Over the course of time and through the combination of many observations, the OCS 114 can further qualify the strength of those relationships. Instead, suppose a first user searches for a concept "A" and second user searches for "B". Once one of the user connects A and B in a single search session using the ROT, then this information can be centralized in the OCS 114 and the other user's search session can be made aware of the joint relevance of A and B. Strength of a relationship could be based on a variety of observed behavior, such as the frequency with which search items appear in conjunction (same search session or same classification), etc. It is easy to imagine a number of scoring systems to evaluate the strength of these relationships. Given that the relationships are established and that they are optionally qualified by their strength, various algorithms can be used to form groups or clusters of search items within the information space. These "semantic clusters" are of great significance because they provide new ways of returning related information to search users and furthermore the clustering represents vetted relationships determined by intelligent users. This type of intelligent analysis is based on the collective empirical decision making of human users, and cannot otherwise be generated.

Interactions Tracked by the ROT and the OCS

In some embodiments, within a search session with ROT 202, after submitting each query to a conventional search engine or to the native SSOS search engine, the user employs the ROT 202 features to perform various operations on the results that are returned. Some examples of operations include, but are not limited to:

Selecting an item as being of interest and "keeping" the item for future perusal;

Forming groups or categories of items within the session, based on any user-defined organizational goals. The categories can be named by the user and are useful to the user for sorting and prioritizing the many items visited in the content source 104. Categories can be scoped to the search session, or can be "global" for the user, meaning they are shared among search sessions performed by the same user in the ROT 202;

Selecting an item to share it with others. Sharing may occur by various means, such as emailing the item, or through a "publish-subscribe" mechanism, whereby a user may post the item to a known category to which other users may subscribe; all the subscribing users receive a notification of some kind, such as a pop-up window, or other message indicating that new content is present in the category;

Permanently filtering an item from either the active session, or any other future session. For example, filters may be declared to be permanent, such that they would apply to the current items in the session, to future items in the session, or to other future search sessions as well;

Rating the quality or value of an item so it can be positioned among other items in terms of value;

Searching for specific terms or other properties (including the items' meta data) within a set of items in order to determine if they should remain within the session (i.e., "filtering");

Sorting the items in the session, or within a category, according to available meta-data about the items. Similarly to filtering, the sorting process can use any of the properties of the items (e.g., the item's time stamp, language, length, presence of certain terms, the search terms via which the item was discovered if an index-based search engine was used, etc.);

Automatically organizing the items in the session or returned by a conventional search engine. A number of algorithms are possible based on the content and/or meta-data of the items. However, a particular organization of interest leverages the existence of the OCT 112. Specifically, the items can be organized into a hierarchical structure that is a sub-set of the OCT 112; or Removing items from, or rearranging items among, the automated categories described above.

Any of the operations may be applied to multiple items in the session, or to one item at a time.

Targeted Information Enabled by the SSOS

In some embodiments, the SSOS 100 provides an environment for delivering targeted information to a user, such as advertisements, banners, messages, and the like. For example, the operator of server 110 may offer advertisers an opportunity to deliver advertised information to the user within the ROT 202. Appropriate advertised information can be selected based on either: the user's submitted queries; or on the search results themselves. For instance, one advertising model would offer the opportunity to associate advertisement information with semantic clusters. In such a model, whenever a user conducts a search that retrieves information from the semantic cluster of interest, one or more related advertisements can be delivered and displayed within the ROT 202. In other embodiments, advertisements can be associated with specific folders.

As another example, within the CTB 206, targeted ads or messages can be presented as users navigate into different folders of the OCT 112. These can of course be driven by the topic of the folder, e.g., advertising space and time to fast food restaurants, such as McDonalds™, Burger King™, etc. may appear in the "food/fast food" folder.

Persistent Search Sessions

Leveraging the concepts of the search session and the dynamically evolving content of the OCT 112, the SSOS 100 can also deliver a dynamic search capability that continues to accumulate new search results over time. These newly added results can be automatically added to a user's session or the results to reflect this new content. In addition, the system optionally may automatically organize those results.

For example, during a typical search, at any point during the session, the user may enable the dynamic search capability and may then close the ROT 202 or leave it unattended. Until otherwise directed, the OCS 114 periodically updates the search results and possibly their organization based on the evolving state of the OCT 112. The user may return to the search session at any time to observe an accumulation (or conversely a reduction) and evolving organization of the search results. Using this approach, the search session results benefit from the ongoing intelligent processing that is conducted by the community of users of the information spaces 104.

Figure 3:
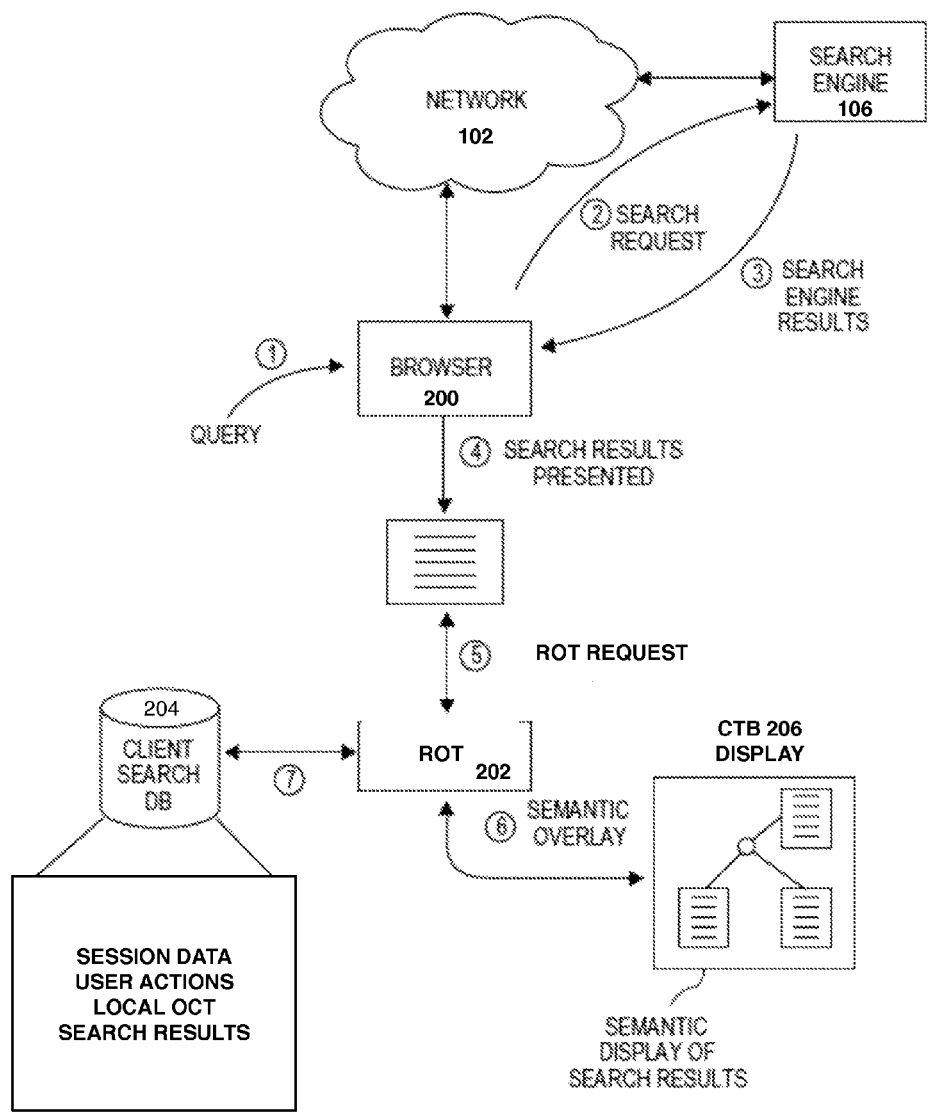
FIG. 3 illustrates an exemplary process for a first mode of searching by a user in accordance with the present disclosure.

FIG. 3 illustrates an exemplary process for a first assisted mode of searching by a user in accordance with the present disclosure. In particular, FIG. 3 illustrates one example of the ROT 202 operating in a stand-alone mode. That is, the ROT 202 operates independently of the CTPE 110 or OCT 112. For purposes of explanation, a direct search example is shown in FIG. 3.

As shown, the user may submit a search request or query to the browser 200. Next, the browser 200 forwards the search request or query to one or more search engines 106. The search engines 106 may then provide various sets of search results back to the browser 200. As is well known, these search results are typically provided in the form of a listing on a web page having one or more formats. For purposes of this disclosure, these search results from the search engines 106 are referred to as raw search results.

The browser 200 may provide the raw search results to the ROT 202 in various ways. In some embodiments, the browser 200 may be configured to automatically forward any raw search results obtained from one or more search engines 106. In other embodiments, the ROT 202 is configured to extract the search results, such as by discovering and parsing the contents of a page displayed by the browser 200. The extraction of the search results may be triggered automatically, for example, by the ROT 202 or based on a request by the user. Alternatively, the ROT 202 may be integrated with one or more conventional search engines 106 such that the ROT 202 is able to use the search engines 106 to retrieve search queries, conduct searches, and obtain search results. Such integration may be performed via an API provided by the search engines 106, the browser 200, or via an operating system interface provided by the client device 108.

The ROT 202 then processes the raw search results. In particular, the ROT 202 may query its local client search customized database 204 on the client 108. The ROT 202 attempts to organize the raw search results to enhance the semantics of the search and provide an appropriate display, e.g., a semantic overlay of the results.

The ROT 202 may collect information about the interactions by the user with this overlay display. This interaction information may then be used to refine or modify the organizational guidance used by the ROT 202. In addition, this interaction information may also be used to enhance the filtering, ranking, and highlighting of results within the semantic overly by the ROT 202. This user interaction is then used in future sessions.

Figure 4:
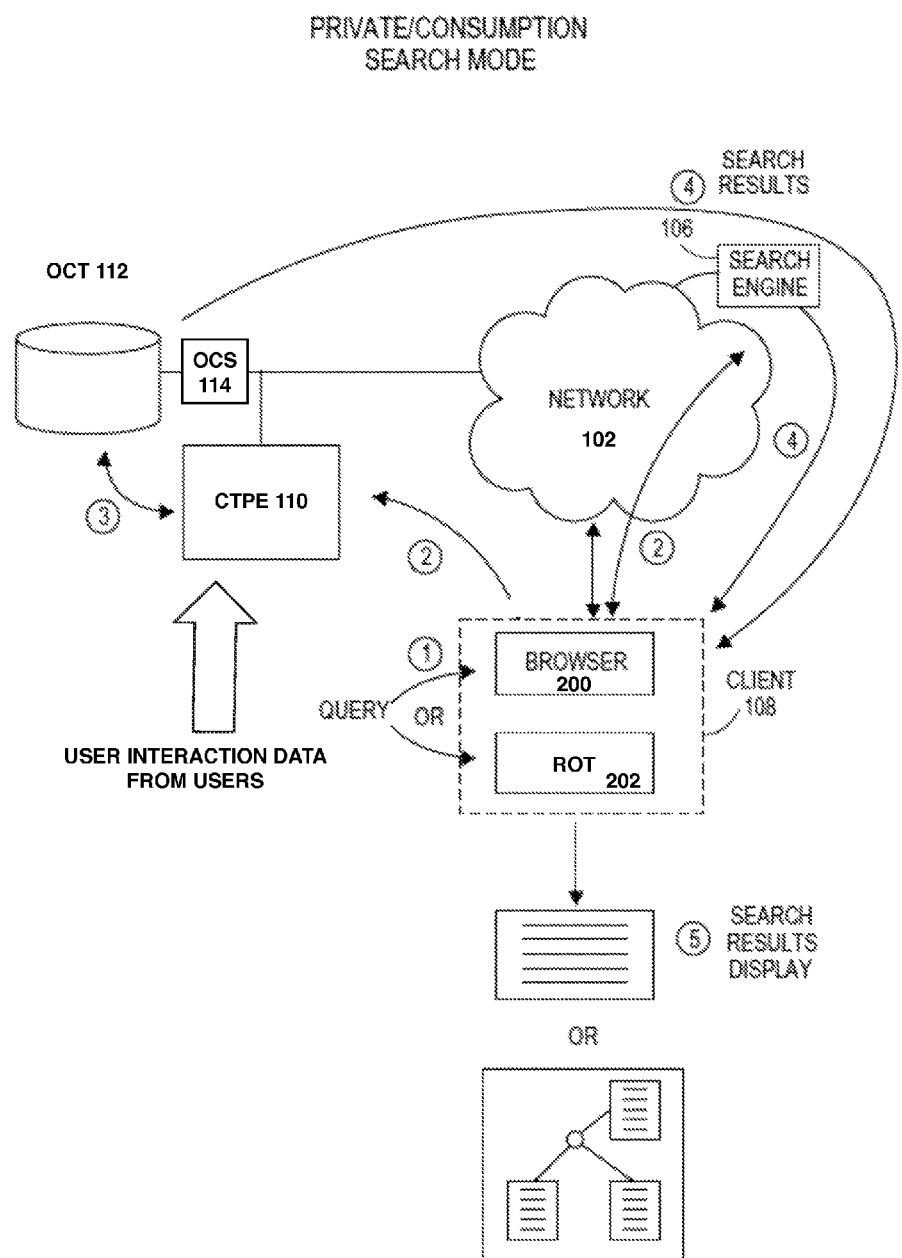
FIG. 4 illustrates an exemplary process for a second mode of searching by a user in accordance with the present disclosure.

FIG. 4 illustrates an exemplary process for a second assisted mode of searching by a user in accordance with the present disclosure. In particular, FIG. 4 illustrates one example of the ROT 202 operating in a consumer mode. That is, the ROT 202 may consume information via the OCS 114 from the OCT 112, but does not feedback information about client 108 or the user. For purposes of explanation, a search example is shown in FIG. 4. The search is based on index-based search of the OCT and may be used in combination with conventional search results from typical search engines.

As shown, the user may submit a search request or query to the browser 200, or to the ROT 202. Next, the browser 200 forwards the search request or query to one or more search engines 106 and the client 108 forwards a search request to the OCS. The search engines 106 and the OCS may then provide various sets of search results back to the browser 200 in a semantically organized format, such as a set of folders that are arranged consistent with the OCT 112. As is well known, these search results from the search engine 106 are typically provided in the form of a listing on a web page having one or more formats. For purposes of this disclosure, these search results from the search engines 106 are referred to as raw search results.

The browser 200 may provide its raw search results to the ROT 202 in various ways. In some embodiments, the browser 200 may be configured to automatically forward any raw search results obtained from one or more search engines 106. In other embodiments, the ROT 202 is configured to extract the search results, such as by discovering and parsing the contents of a page displayed by the browser 200. The extraction of the search results may be triggered automatically, for example, by the ROT 202 or based on a request by the user. Alternatively, the ROT 202 may be integrated with one or more conventional search engines 106 such that the ROT 202 is able to use the search engines 106 to retrieve search queries, conduct searches, and obtain search results. Such integration may be performed via an API provided by the search engines 106, the browser 200, or via an operating system interface provided by the client device 108.

The results from the OCS 114 may be provided directly to the ROT 202. In addition to results, the OCS 114 may provide other information, such as organizational information, updates, etc.

The ROT 202 then processes the search results from both sources, e.g., the conventional search engines (such as google.com, and the like) and a semantically enhanced source, such as the OCT 112. In particular, the ROT 202 may query its local client search database 204 and select one or more organizational guidance mechanisms. Of note, the local client search database 204 may be implemented using local storage systems, such as direct attached storage, network attached, a storage area network, and the network. Alternatively, some or all of the local client search database 204 may be implemented using remote storage, such as cloud-based storage services via the network 102. The local client search database 204 may comprise a similar semantic organization provided by the OCT 112, but comprise content items or references to content items that are retained for specific purposes of the user. The ROT 202 may also refer to information from the OCT 112 to organize the search results. Once organized, the ROT 202 may provide an appropriate display, e.g., a semantic overlay of the results. For example, the ROT 202 may organize the raw results based on date/time, subject, provenance (or source), e.g., a website of the content, file type, etc. In a one embodiment, the ROT organizes the information into semantic classifications, such as folders.

Figure 5:
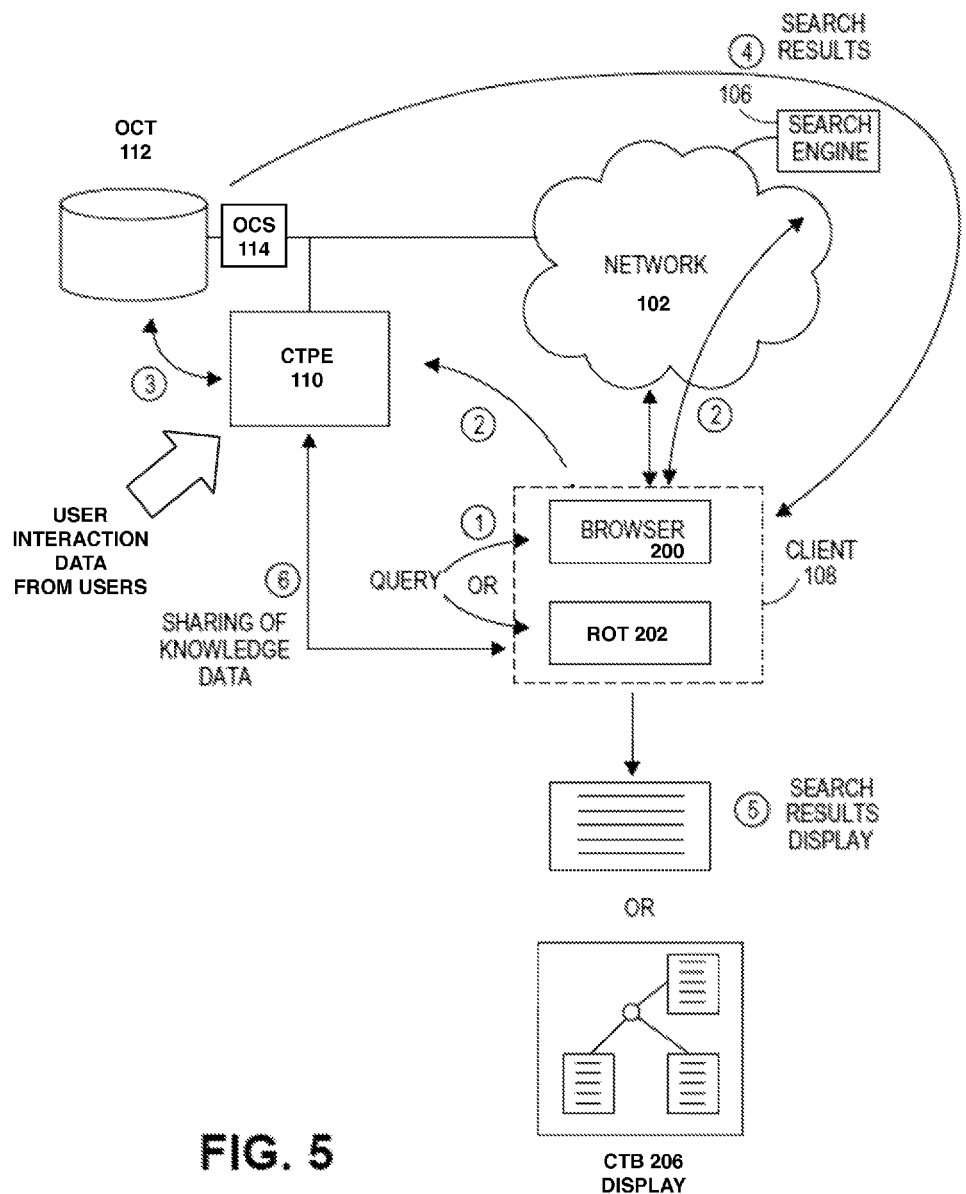
FIG. 5 illustrates an exemplary process for a third mode of searching by a user in accordance with the present disclosure.
Figure 6:
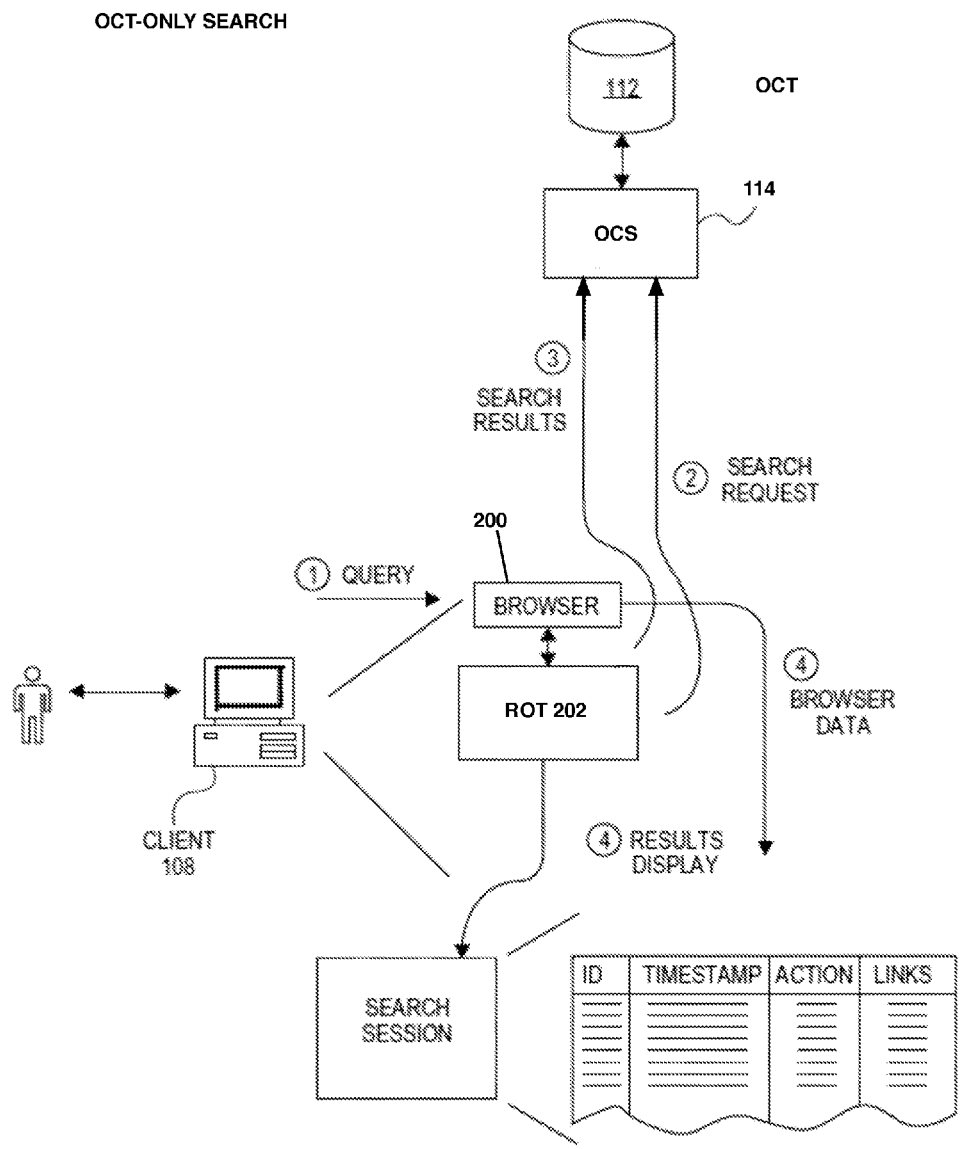
FIG. 6 illustrates an exemplary process for a fourth mode of searching by a user in accordance with the present disclosure.

FIG. 5 illustrates an exemplary process for a third assisted mode of searching by a user in accordance with the present disclosure. In particular, FIG. 5 illustrates one example of the ROT 202 operating in a knowledge sharing mode. That is, the ROT 202 may consume information from the OCS 114 and feed back information to the CTPE 110. For purposes of explanation, a search example is shown in FIG. 5.

As shown, the user may submit a search request or query to the browser 200 or to the ROT 202. Next, the browser 200 forwards the search request or query to one or more search engines 106 and the client 108 forwards a search request to the CTPE 110. The search engines 106 and the CTPE 110 may then provide various sets of search results back to the browser 200. As is well known, these search results from the search engine 106 are typically provided in the form of a listing on a web page having one or more formats. For purposes of this disclosure, these search results from the search engines 106 are referred to as raw search results.

The browser 200 may provide the raw search results to the ROT 202 in various ways. In some embodiments, the browser 200 may be configured to automatically forward any raw search results obtained from one or more search engines 106. In other embodiments, the ROT 202 is configured to extract the search results, such as by discovering and parsing the contents of a page displayed by the browser 200. The extraction of the search results may be triggered automatically, for example, by the ROT 202 or based on a request by the user. Alternatively, the ROT 202 may be integrated with one or more conventional search engines 106 such that the ROT 202 is able to use the search engines 106 to retrieve search queries, conduct searches, and obtain search results. Such integration may be performed via an API provided by the search engines 106, the browser 200, or via an operating system interface provided by the client device 108.

The ROT 202 then processes the search results from both sources, for example, content sources and semantically enhanced sources such as the OCT. In particular, the ROT 202 may query its local client search customized database 204 and select one or more structures for organizing the results. The ROT 202 may also refer to information from the OCT via the OCS to organize the search results. Once organized, the ROT 202 may provide an appropriate display, e.g., a semantic overlay of the results. For example, once the user has obtained a sufficient amount of search results, the search results may be organized into a structure similar to the OCT albeit on a smaller scale. The OCT may further organize or refine the raw results based on date/time, subject, source, search session, file type, etc. In this mode, the ROT 202 may collaborate with the OCT 112 to provide a semantically organized display of the results. Multiple approaches are possible for the ROT and OCT to collaborate with each other. In addition, the ROT 202 may use cloud-based information systems that are provided over the network 102.

Of note, the OCS also provides services telling the ROT how to organize search results. For example, the ROT can provide as input a list of raw results from conventional search engines to the OCS. OCS provides the semantics to the ROT. ROT then displays the results now in semantically-enhanced result. The OCS may organize the data or send enough semantic information to the ROT to have the ROT itself apply organization of the data. The information may be shared in various ways, for example, by communications between the ROT 202, the OCS 114, and/or the browser 200. Furthermore, in some embodiments, the ROT 202 may be configured to work with various cloud-based or remote storage of semantic information from the OCT 112.

In this knowledge shared mode and the consumer mode, the semantic overlay may be dynamic based on the information shared with the OCT 112. For example, the ranking or significance of various results may be updated in real time, such as recently breaking news on a particular topic. As another example, the organization of the results may be updated dynamically or in real time depending on the semantic information collected from one or more users and new update may be presented to the ROT. As noted, the ROT 202 may also collect information about the interactions by the user with the items contained in the ROT, regardless of their provenance. This interaction information may then be used to refine or modify the organizational guidance used by the ROT 202. In addition, this interaction information may also be used to enhance the filtering, ranking, and highlighting of results within the semantic overlay by the ROT 202. In this shared mode, the ROT 202 may share this knowledge data with the CTPE 110 at various intervals and points in times, on an ad hoc basis, or per user interaction, when a user closes a session, upon user request, etc. The ROT 202 may also employ various security measures, such as, encryption of its communications with the CTPE 110, anonymizing data, and the like.

Figure 7:
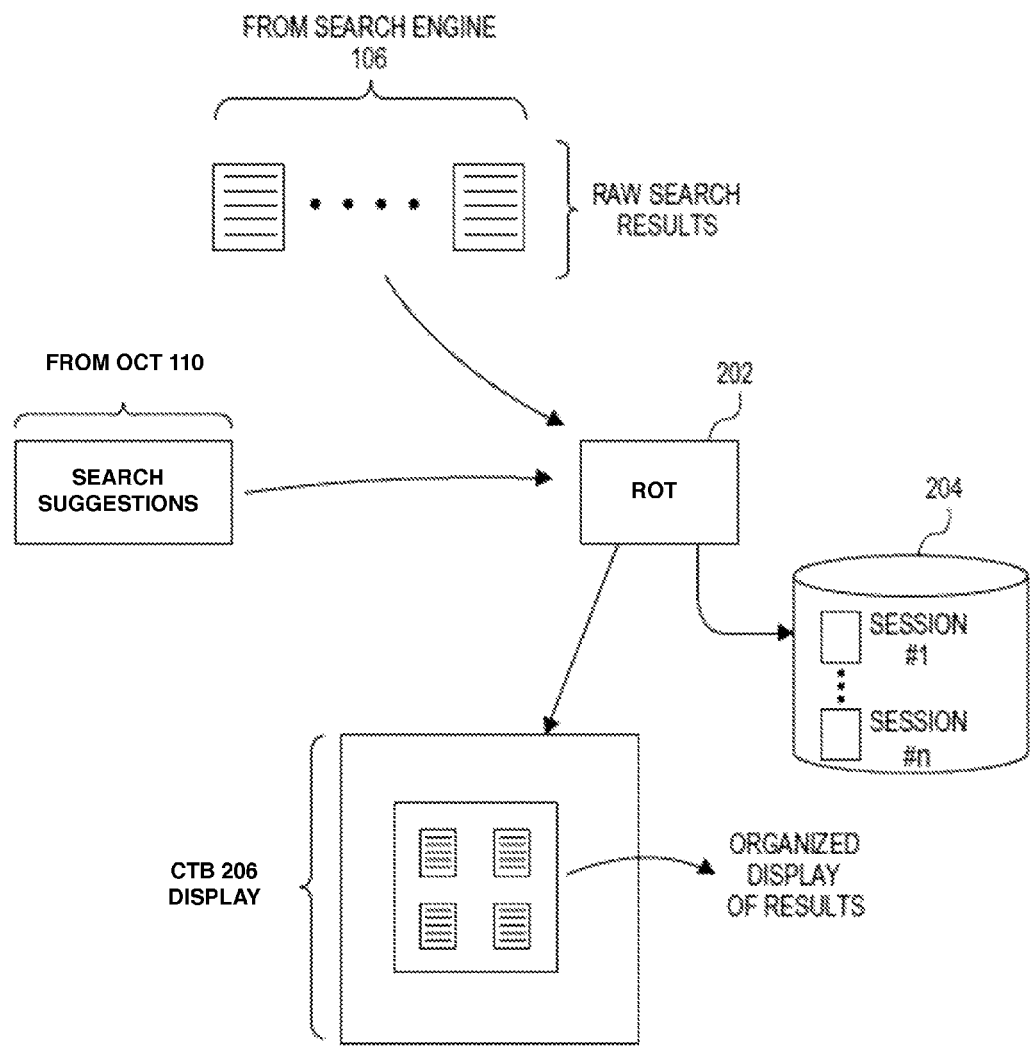
FIG. 7 conceptually illustrates how the search assistant client of the present disclosure may organize searches by a user.

FIG. 7 conceptually illustrates how the search assistant client of the present disclosure may organize searches by a user. For example, as shown, the raw search results from the search engines 106 are collected by the ROT 202. These raw search results are then organized within a database 204 according to one or more search sessions. In some embodiments, local databases are configured to be specific to a user and allow users to access their searches from different machines or remotely in a cloud-based storage environment. In particular, these local databases may comprise a similar organizational structure as the OCT 112, but have content items that are retained for the specific purpose of a user. The local databases may be implemented with local storage or may comprise remote storage services, such as cloud-based storage via the network 102.

In addition, the ROT 202 may receive organizational guidance from the CTPE 110. This guidance may be static or dynamic. In addition, the guidance may be customized according to the user, a group of users, topic, date, file type, etc.

Throughout this document, various functions available to the user of the SSOS 100, primarily via the ROT 202 and CTB 206. Similar functions are available to other systems, such as other programs requiring access to information stored within the SSOS 100. Those skilled in the art should recognize that the entire set of functions described herein may also be offered via programmatic interfaces to other systems. These interfaces provide a set of operations to interact with the SSOS 100 in a manner that is well-defined in order to obtain each type of supported data set or to cause the SSOS to modify its own internal state. The sequences and combinations of operations that produce specific types of results are defined by the SSOS as part of its system interface protocol. The protocol may be implemented in various forms, including a library of classes and methods that abstract lower level mechanisms; a set of web-services consisting of defined messages types using a protocol such as SOAP (i.e., using HTTP as the lower-level transport protocol); a representational state ("REST" or "RESTful") API; or any other form of communication to the SSOS 100 that can provide transport for the commands comprised by the protocol.

Although the present disclosure provides certain embodiments and applications, other embodiments that are apparent to those of ordinary skill in the art, including embodiments, which do not provide all of the features and advantages set forth herein, are also within the scope of this disclosure.

What is claimed is:

1. A computer-implemented method comprising:
   receiving, via a network at a first client computer, a plurality of content items from one or more content sources, wherein each of the plurality of content items is a copy of a content item or a reference to a content item;
   presenting the plurality of content items in an organizational tool at the first client computer;
   receiving a first user's interactions with the plurality of content items via the organizational tool, wherein the first user's interactions comprise steps to organize the plurality of content items within a first local hierarchy of folders maintained by the organizational tool; and
   transmitting the first user's interactions, via the network, from the first client computer to a server computer, wherein a policy engine at the server computer determines whether to update a global hierarchy of folders comprising the plurality of content items based on the first user's interactions and interactions of at least one other user.

2. The method of claim 1, wherein the interactions of at least one other user comprise steps taken by a second user to organize a second plurality of content items within a second local hierarchy of folders maintained by a second organizational tool at a second client computer.

3. The method of claim 2, further comprising:
   transmitting the interactions of the second user, via the network, from the second client computer to the server computer.

4. The method of claim 1, wherein the first user's interactions include providing a score for at least one of the plurality of content items within the first local hierarchy of folders.

5. The method of claim 1, wherein the first user's interactions include deleting at least one of the plurality of content items within the first local hierarchy of folders.

6. The method of claim 1, wherein the first user's interactions include moving at least one of the plurality of content items from one folder to another folder within the first local hierarchy of folders.

7. The method of claim 1, wherein the first user's interactions include inputting a new folder name in the first local hierarchy of folders for at least one of the plurality of content items.

8. The method of claim 1, wherein the first user's interactions include inputting a folder name in the global hierarchy of folders as a proposed location for at least one of the plurality of content items.

9. The method of claim 1, wherein the one or more content sources includes an Internet search engine.

10. The method of claim 1, wherein receiving the plurality of content items from one or more content sources further comprises receiving the plurality of content items in an organized format based on the organization of the global hierarchy of folders.

11. The method of claim 1, further comprising:
    receiving a request from the first user to organize the first local hierarchy of folders and automatically reorganizing the first local hierarchy of folders based on the global hierarchy of folders.

12. The method of claim 11, wherein automatically reorganizing the first local hierarchy of folders comprises:
    transmitting the request to the server computer;
    receiving, from the server computer, a proposed reorganization of the first local hierarchy of folders based on the global hierarchy of folders;

receiving an approval from the first user; and automatically reorganizing one or more of the content items within the first local hierarchy of folders based on the global hierarchy of folders.

13. The method of claim 1, wherein the first user's interactions and the interactions of at least one other user include respective votes concerning the placement of at least one of the plurality of content items in the global hierarchy of folders.

14. The method of claim 13, wherein the policy engine determines a score based on the votes and updates the placement of the at least one of the plurality of content items in the global hierarchy of folders based on the score.

15. The method of claim 14, further comprising:

filtering the at least one of the plurality of content items from the presentation of the plurality of content items in the organizational tool at the first client computer.

16. A system comprising:

an organizational tool at a first client computer, wherein the organizational tool is configured to:

present a plurality of content items, wherein the plurality of content items are received from one or more sources, via a network, at the first client computer, and wherein each of the plurality of content items is a copy of a content item or a reference to a content item;

receive a first user's interactions with the plurality of content items, wherein the first user's interactions comprise steps to organize the plurality of content items within a first local hierarchy of folders maintained by the organizational tool; and transmit the first user's interactions, via the network, to a server computer; and a policy engine at the server computer, wherein the policy engine is configured to determine whether to update a global hierarchy of folders comprising the plurality of content items based on the first user's interactions and interactions of at least one other user.

17. The system of claim 16, further comprising:

a second organizational tool at a second client computer, wherein the second organizational tool is configured to receive the interactions of a second user, wherein the interactions of the second user comprise steps to organize a second plurality of content items within a second local hierarchy of folders maintained by the second organizational tool.

18. The system of claim 17, wherein the second organizational tool is further configured to transmit the interactions of the second user, via the network, from the second client computer to the server computer.

19. The system of claim 16, wherein the first user's interactions include providing a score for at least one of the plurality of content items within the first local hierarchy of folders.

20. The system of claim 16, wherein the first user's interactions include deleting at least one of the plurality of content items within the first local hierarchy of folders.

21. The system of claim 16, wherein the first user's interactions include moving at least one of the plurality of content items from one folder to another folder within the first local hierarchy of folders.

22. The system of claim 16, wherein the first user's interactions include inputting a new folder name in the first local hierarchy of folders for at least one of the plurality of content items.

23. The system of claim 16, wherein the first user's interactions include inputting a folder name in the global hierarchy of folders as a proposed location for at least one of the plurality of content items.

24. The system of claim 16, wherein the one or more content sources includes an Internet search engine.

25. The system of claim 16, wherein the organizational tool is further configured to receive the plurality of content items in an organized format based on the organization of the global hierarchy of folders.

26. The system of claim 16, wherein the organizational tool is further configured to:

receive a request from the first user to organize the first local hierarchy of folders; and automatically reorganize the first local hierarchy of folders based on the global hierarchy of folders.

27. The system of claim 26, wherein the organizational tool is further configured to:

transmit the request to the server computer;

receive, from the server computer, a proposed reorganization of the first local hierarchy of folders based on the global hierarchy of folders;

receive an approval from the first user; and automatically reorganize one or more of the content items within the first local hierarchy of folders based on the global hierarchy of folders.

28. The system of claim 16, wherein the first user's interactions and the interactions of at least one other user include respective votes concerning the placement of at least one of the plurality of content items in the global hierarchy of folders.

29. The system of claim 28, wherein the policy engine is further configured to:

determine a score based on the votes; and update the placement of the at least one of the plurality of content items in the global hierarchy of folders based on the score.

30. The system of claim 29, wherein the organizational tool is further configured to filter the at least one of the plurality of content items from the presentation of the plurality of content items.

* * * * *